(12) United States Patent
Tang et al.

(10) Patent No.: US 12,505,035 B2
(45) Date of Patent: Dec. 23, 2025

(54) MEMORY DEVICE AND ITS OPERATING METHOD, MEMORY SYSTEM AND OPERATING METHOD THEREOF

(71) Applicant: YANGTZE MEMORY TECHNOLOGIES CO., LTD., Wuhan (CN)

(72) Inventors: Xingwei Tang, Wuhan (CN); Guangchang Ye, Wuhan (CN); Lu Guo, Wuhan (CN)

(73) Assignee: YANGTZE MEMORY TECHNOLOGIES CO., LTD., Wuhan (CN)

( * ) Notice: Subject to any disclaimer, the term of this patent is extended or adjusted under 35 U.S.C. 154(b) by 0 days.

(21) Appl. No.: 18/595,838

(22) Filed: Mar. 5, 2024

(65) Prior Publication Data
US 2025/0147877 A1    May 8, 2025

Related U.S. Application Data

(63) Continuation of application No. PCT/CN2023/130025, filed on Nov. 6, 2023.

(51) Int. Cl.
*G06F 12/02* (2006.01)

(52) U.S. Cl.
CPC ............ *G06F 12/0246* (2013.01)

(58) Field of Classification Search
CPC .................................... G06F 12/0246
See application file for complete search history.

(56) References Cited

U.S. PATENT DOCUMENTS

| | | | |
|---|---|---|---|
| 2010/0157671 A1 | 6/2010 | Mokhlesi | |
| 2013/0016558 A1* | 1/2013 | Ahn | G11C 16/0483 365/185.03 |
| 2015/0117089 A1* | 4/2015 | Minemura | G11C 13/0069 365/148 |
| 2018/0173447 A1* | 6/2018 | Chin | G06F 3/0619 |
| 2019/0198069 A1* | 6/2019 | Kale | G11C 29/36 |
| 2022/0076738 A1* | 3/2022 | Bazarsky | G11C 11/5628 |
| 2022/0230697 A1* | 7/2022 | Di Vincenzo | G11C 29/52 |
| 2023/0058645 A1* | 2/2023 | Kadasani | G06F 3/0655 |

FOREIGN PATENT DOCUMENTS

| | | |
|---|---|---|
| CN | 110322915 A | 10/2019 |
| CN | 112242157 A | 1/2021 |
| CN | 112669893 A | 4/2021 |

* cited by examiner

*Primary Examiner* — Prasith Thammavong
(74) *Attorney, Agent, or Firm* — BAYES PLLC

(57) ABSTRACT

An example of the present application discloses a memory device and operating method thereof, a memory system and operating method thereof, wherein the memory device includes: an array of memory cells; a peripheral circuit coupled to the array of memory cells and configured to: obtain a first result corresponding to a target location in the array of memory cells at an initial target read voltage; perform multiple adjustments to the initial target read voltage, and obtain the first result corresponding to the target location at the target read voltage after each of the adjustments respectively; determine a valley voltage in accordance with a plurality of the obtained first results.

20 Claims, 19 Drawing Sheets

MEMORY DEVICE AND ITS OPERATING METHOD, MEMORY SYSTEM AND OPERATING METHOD THEREOF

CROSS-REFERENCE TO RELATED APPLICATIONS

This application is a continuation of International Application No. PCT/CN2023/130025, filed on Nov. 6, 2023, the content of which is incorporated herein by reference in its entirety.

TECHNICAL FIELD

The present application relates but is not limited to a memory device and operating method thereof, a memory system and operating method thereof.

BACKGROUND

With the development of science and technology, the market size of the integrated circuit industry is getting larger and larger, and the process and technology for a non-volatile memory device in the entire integrated circuit industry have experienced rapid development in recent years, where NAND memory is particularly widely used. NAND memory implements a function of data storage through capturing and storing charges in the gate dielectric layers of the memory cells included in the NAND memory. However, with the use increasing over time, the charge stored in the memory cell may change due to the increase of the use time, repeated read operations, cross temperature, etc., therefore affecting the accuracy of reading data stored in the memory cell.

SUMMARY

According to one aspect of the present disclosure, a memory device is provided. The memory device may include an array of memory cells. The memory device may include a peripheral circuit coupled to the array of memory cells. The peripheral circuit may be configured to obtain a first result corresponding to a target location in the array of memory cells at an initial target read voltage. The first result may include information which represents a number of bits at the target location which are flipped in a result of reading at a target read voltage relative to specified data which is actually stored. The specified data may be stored at the target location. The peripheral circuit may be configured to perform multiple adjustments to the initial target read voltage, and obtain a first result corresponding to the target location at the target read voltage after each of the multiple adjustments respectively. The peripheral circuit may be configured to determine a valley voltage in accordance with a plurality of the obtained first results. In some implementations, the valley voltage may be a read voltage for performing a read operation on the array of memory cells.

In some implementations, the array of memory cells may include a plurality of memory blocks, each of the memory blocks includes a plurality of memory rows, and each of the memory rows includes a plurality of memory cells. In some implementations, a preset number of the memory cells may form a code word. In some implementations, the peripheral circuit may be configured to, in a process of performing a write operation on the array of memory cells, write the specified data at the target location in the array of memory cells. In some implementations, the target location may include at least one of each of the memory blocks, each of the memory rows, and each of the code words.

In some implementations, the peripheral circuit may be configured to store the specified data. In some implementations, the peripheral circuit may be configured to read the specified data stored at the target location at the initial target read voltage to obtain a second result. In some implementations, the peripheral circuit may be configured to perform a logical operation on the stored specified data and the second result to obtain a third result. In some implementations, the peripheral circuit may be configured to, when the first result includes the number of bits which represents the number of bits at the target location which are flipped in the result of reading at the target read voltage relative to specified data which is actually stored, count the number of bits in the third result that represent flip of bits in the second result relative to the specified data, and take the result of counting to be the first result. In some implementations, the peripheral circuit may be configured to, when the first result includes information which represents a relationship of size between the number of bits at the target location which are flipped in a result of reading at the target read voltage relative to specified data which is actually stored and a first preset value, compare the number of bits in the third result that represent flip of bits in the second result relative to the specified data with a first preset value, and take the result of comparing to be the first result.

In some implementations, the peripheral circuit may include a first latch configured to store the specified data. In some implementations, the peripheral circuit may include a second latch configured to store the second result. In some implementations, the peripheral circuit may include a third latch configured to store the third result.

In some implementations, the first result may include information which represents a relationship of size between the number of bits at the target location which are flipped in a result of reading at the target read voltage relative to specified data which is actually stored and a first preset value. In some implementations, when the number of bits in the third result which represents the number of bits in the second result which are flipped relative to the specified data is greater than the first preset value, the first result is a failed state. In some implementations, when the number of bits in the third result which represents the number of bits in the second result which are flipped relative to the specified data is less than or equal to the first preset value, the first result is a pass state.

In some implementations, the peripheral circuit may be configured to, when multiple adjustments are performed to the initial target read voltage, perform a first adjustment to the read voltage after a previous adjustment for each of the multiple adjustments, a step size of the first adjustment being a fixed value.

In some implementations, the peripheral circuit may be configured to, when multiple adjustments are performed to the initial target read voltage, if a change from a failed state to at least one pass state and then to a failed state again is indicated by a plurality of the first results corresponding to the target read voltages after multiple adjustments, stop adjusting the read voltage.

In some implementations, the peripheral circuit may be configured to, when a number of pass states between the failed states at two ends indicated by the plurality of first results corresponding to the adjusted read voltages include one, take the adjusted read voltage corresponding to the one pass state to be the valley voltage. In some implementations, the peripheral circuit may be configured to, when the number of pass states between the failed states at two ends indicated by the plurality of first results corresponding to the adjusted read voltages include more than one, take the adjusted read voltage corresponding to one pass state at a middle position among the more than one pass states to be the valley voltage.

In some implementations, the peripheral circuit may be configured to, after a first pass state after failed states occurs among the plurality of first results corresponding to the target read voltages after multiple adjustments, perform a second adjustment to the read voltage after a previous adjustment, the step size of the second adjustment being less than that of the first adjustment.

In some implementations, the peripheral circuit may be configured to, after a first pass state after failed states occurs among the plurality of first results corresponding to the target read voltages after multiple adjustments, perform a third adjustment to the read voltage after a previous adjustment in accordance with the result of counting in the third result corresponding to the first pass state, the step size of the third adjustment varying according to the number of bits in the third result which represents the number of bits in the second result which are flipped relative to the specified data.

In some implementations, the first result may include the number of bits which represents the number of bits at the target location which are flipped in a result of reading at the target read voltage relative to specified data which is actually stored. In some implementations, the peripheral circuit may be configured to, when the first result corresponding to the initial target read voltage is less than or equal to the first preset value, perform a first adjustment to the initial target read voltage in accordance with the first result to obtain a target adjusted read value. In some implementations, the peripheral circuit may be configured to obtain a first result corresponding to the target location at the target adjusted read voltage.

In some implementations, the peripheral circuit may be configured to, when the first result corresponding to the target location at the target adjusted read voltage is less than the first preset value and greater than a second preset value, continue to perform the first adjustment to the target adjusted read voltage, and obtain a first result corresponding to the target location at the adjusted read voltage, until the first result corresponding to a final adjusted read voltage is less than or equal to the second preset value. In some implementations, a step size of the first adjustment may vary in accordance with the value of the first result.

In some implementations, the peripheral circuit may be configured to, when the first result corresponding to the final adjusted read voltage is less than or equal to the second preset value, take the read voltage corresponding to the smallest first result among the plurality of first results to be the valley voltage.

In some implementations, the peripheral circuit may be configured to, when a plurality of first results corresponding to the target read voltages after multiple adjustments are all failed states, or the plurality of first results are all greater than the first preset value, increase the step size corresponding to the first adjustment. In some implementations, the peripheral circuit may be configured to, when an increased step size of the first adjustment exceeds a third preset value, decrease an amount of reading on the specified data stored at the target location.

In some implementations, the peripheral circuit may be configured to obtain a first preset value. In some implementations, the first preset value may be obtained in accordance with historical data, and less than or equal to an upper limit of a fail bit count supported by the memory device.

In some implementations, the peripheral circuit may be configured to, before obtaining the first result corresponding to the target location at the initial target read voltage, set a read mode of the memory device to a single level read mode. In some implementations, the single level read mode may include reading at least one bit of storage data stored in the memory cell with read voltages at one level.

In some implementations, the memory cell in the array of memory cells may include M bits, the memory device may include M-type pages, and the memory cell with M bits may read its M bits of storage data with read voltages at N levels. In some implementations, the M and N may both integers greater than 1, and $N=2^M-1$. In some implementations, the peripheral circuit may be configured to, for read voltages at each level of the read voltages at multiple levels corresponding to each type of page, determine the valley voltage at each level in accordance with the plurality of first results corresponding to multiple read voltages at each level.

According to another aspect of the present disclosure, a memory system is provided. The memory system may include one or more memory devices. The one or more memory device may include an array of memory cells and a peripheral circuit coupled to the array of memory cells. The peripheral circuit may be configured to obtain a first result corresponding to a target location in the array of memory cells at an initial target read voltage. The first result may include information which represents a number of bits at the target location which are flipped in a result of reading at a target read voltage relative to specified data which is actually stored. The specified data may be stored at the target location. The peripheral circuit may be configured to perform multiple adjustments to the initial target read voltage, and obtain the first result corresponding to the target location at the target read voltage after each of the adjustments respectively. The peripheral circuit may be configured to determine a valley voltage in accordance with a plurality of the obtained first results. The valley voltage may be a read voltage for performing a read operation on the array of memory cells. The memory system may include a memory controller coupled to the memory device and controlling the memory device.

In some implementations, the memory controller may be configured to send a first instruction before performing a read operation on data stored in the memory device. In some implementations, the first instruction may indicate to obtain a valley voltage. In some implementations, the memory device may be configured to receive the first instruction, and obtain a valley voltage. In some implementations, the memory device may be configured to send the obtained valley voltage to the memory controller. In some implementations, the memory controller may be further configured to perform a read operation on data stored in the memory device in accordance with the valley voltage. In some implementations, the memory controller may be further configured to perform an error correction code decoding operation on a read result of the read operation.

According to another aspect of the present disclosure, a memory system is provided. The memory system may include at least one memory device. The memory system may include a memory controller coupled to the at least one memory device. The memory controller may be configured to obtain a first result corresponding to a target location in an array of memory cells in the memory device at an initial target read voltage. The first result includes information which represents a number of bits at the target location which are flipped in a result of reading at the target read voltage relative to specified data which is actually stored. The specified data may be stored at the target location. The memory controller may be configured to perform multiple adjustments to the initial target read voltage, and obtain the first result corresponding to the target location at the target read voltage after each of the adjustments respectively. The memory controller may be configured to determine a valley voltage in accordance with a plurality of the obtained first results. The valley voltage may be to be a read voltage for performing a read operation on the array of memory cells.

In some implementations, the memory controller is configured to send a second instruction before performing a read operation on data stored in the memory device. In some implementations, the second instruction may indicate to obtain first results corresponding to the target location at multiple different target read voltages. In some implementations, the memory device may be configured to receive the second instruction. In some implementations, the memory device may be configured to obtain a plurality of first results corresponding to the target location at multiple different target read voltages. In some implementations, the memory device may be configured to send the obtained first results to the memory controller. In some implementations, the memory controller may be further configured to determine a valley voltage in accordance with the plurality of first results respectively corresponding to multiple different read voltages. In some implementations, the memory controller may be further configured to perform a read operation on data stored in the memory device in accordance with the valley voltage.

In some implementations, the memory device may be configured to read the specified data stored at the target location at the initial target read voltage to obtain a second result. In some implementations, the memory device may be configured to perform a logical operation on the stored specified data and the second result to obtain a third result. In some implementations, the memory device may be configured to, when the first result includes the number of bits which represents the number of bits at the target location which are flipped in a result of reading at the target read voltage relative to specified data which is actually stored, count the number of bits in the third result that represent flip of bits in the second result relative to the specified data, and take the result of counting to be the first result. In some implementations, the memory device may be configured to, when the first result includes information which represents a relationship of size between the number of bits at the target location which are flipped in a result of reading at the target read voltage relative to specified data which is actually stored and a first preset value, compare the number of bits in the third result that represent flip of bits in the second result relative to the specified data with a first preset value, and take the result of comparing to be the first result.

In some implementations, the data amount of the first result may be less than a preset threshold of data amount.

According to yet another aspect of the present disclosure, a method for operating a memory device is provided. The method may include obtaining a first result corresponding to a target location in an array of memory cells in the memory device at an initial target read voltage. The first result may include information which represents a number of bits at the target location which are flipped in a result of reading at the target read voltage relative to specified data which is actually stored. The specified data may be stored at the target location. The method may include performing multiple adjustments to the initial target read voltage, and obtaining the first result corresponding to the target location at the target read voltage after each of the adjustments respectively. The method may include determining a valley voltage in accordance with a plurality of the obtained first results. The valley voltage may be to be a read voltage for performing a read operation on the array of memory cells.

In some implementations, the array of memory cells may include a plurality of memory blocks, each of the memory blocks includes a plurality of memory rows, and each of the memory rows includes a plurality of memory cells. In some implementations, a preset number of the memory cells may form a code word. In some implementations, the method may further include, in a process of performing a write operation on the array of memory cells, write the specified data at a target location in the array of memory cells. In some implementations, the target location may include at least one of each of the memory blocks, each of the memory rows, and each of the code words.

In some implementations, the method may include storing the specified data. In some implementations, the obtaining a first result corresponding to a target location in the array of memory cells in the memory device at an initial target read voltage may include reading the specified data stored at the target location at the target read voltage to obtain a second result. In some implementations, the obtaining a first result corresponding to a target location in the array of memory cells in the memory device at an initial target read voltage may include performing a logical operation on the stored specified data and the second result to obtain a third result. In some implementations, the obtaining a first result corresponding to a target location in the array of memory cells in the memory device at an initial target read voltage may include, when the first result includes the number of bits which represents the number of bits at the target location which are flipped in a result of reading at the target read voltage relative to specified data which is actually stored, counting the number of bits in the third result that represent flip of bits in the second result relative to the specified data, and taking the result of counting to be the first result. In some implementations, the obtaining a first result corresponding to a target location in the array of memory cells in the memory device at an initial target read voltage may include, when the first result includes information which represents a relationship of size between the number of bits at the target location which are flipped in a result of reading at the target read voltage relative to specified data which is actually stored and a first preset value, comparing the number of bits in the third result that represent flip of bits in the second result relative to the specified data with a first preset value, and taking the result of comparing to be the first result.

In some implementations, the method may include storing the specified data in a first latch of the memory device. In some implementations, the method may include storing the second result in a second latch of the memory device. In some implementations, the method may include storing the third result in a third latch of the memory device.

In some implementations, the first result may include information which represents a relationship of size between the number of bits at the target location which are flipped in a result of reading at the target read voltage relative to specified data which is actually stored and a first preset value. In some implementations, the taking the result of comparing to be the first result may include, when the number of bits in the third result which represents the number of bits in the second result which are flipped relative to the specified data is greater than the first preset value, the first result is a failed state. In some implementations, the taking the result of comparing to be the first result may include, when the number of bits in the third result which represents the number of bits in the second result which are flipped relative to the specified data is less than or equal to the first preset value, the first result is a pass state.

In some implementations, the method may include, when multiple adjustments are performed to the initial target read voltage, performing a first adjustment to the read voltage after a previous adjustment for each of the multiple adjustments. In some implementations, a step size of the first adjustment may be a fixed value.

In some implementations, the method may include, when multiple adjustments are performed to the initial target read voltage, if a change from a failed state to at least one pass state and then to a failed state again is indicated by a plurality of the first results corresponding to the target read voltages after multiple adjustments, stopping adjusting the read voltage.

In some implementations, the determining a valley voltage in accordance with a plurality of the obtained first results may include, when a number of pass states between the failed states at two ends indicated by the plurality of first results corresponding to the adjusted read voltages include one, taking the adjusted read voltage corresponding to the one pass state to be the valley voltage. In some implementations, the determining a valley voltage in accordance with a plurality of the obtained first results may include, when the number of pass states between the failed states at two ends indicated by the plurality of first results corresponding to the adjusted read voltages include more than one, taking the adjusted read voltage corresponding to one pass state at a middle position among the more than one pass states to be the valley voltage.

In some implementations, after a first pass state after failed states occurs among the plurality of first results corresponding to the target read voltages after multiple adjustments, performing a second adjustment to the read voltage after a previous adjustment. In some implementations, the step size of the second adjustment may be less than that of the first adjustment.

In some implementations, the method may include, after a first pass state after failed states occurs among the plurality of first results corresponding to the target read voltages after multiple adjustments, performing a third adjustment to the read voltage after a previous adjustment in accordance with the result of counting in the third result corresponding to the first pass state. In some implementations, the step size of the third adjustment may vary according to the number of bits in the third result which represents the number of bits in the second result which are flipped relative to the specified data.

In some implementations, the first result may include the number of bits which represents the number of bits at the target location which are flipped in a result of reading at the target read voltage relative to specified data which is actually stored. In some implementations, the method may further include, when the first result corresponding to the initial target read voltage is less than or equal to the first preset value, performing a first adjustment to the initial target read voltage in accordance with the first result to obtain a target adjusted read value. In some implementations, the method may further include obtaining a first result corresponding to the target location at the target adjusted read voltage.

In some implementations, the method may include, when the first result corresponding to the target location at the target adjusted read voltage is less than the first preset value and greater than a second preset value, continuing to perform the first adjustment to the target adjusted read voltage, and obtaining a first result corresponding to the target location at the adjusted read voltage, until the first result corresponding to a final adjusted read voltage is less than or equal to the second preset value. In some implementations, a step size of the first adjustment may vary in accordance with the value of the first result.

In some implementations, the determining a valley voltage in accordance with a plurality of the obtained first results may include, when the first result corresponding to the final adjusted read voltage is less than or equal to the second preset value, taking the read voltage corresponding to the smallest first result among the plurality of first results to be the valley voltage.

In some implementations, the method may include, when a plurality of first results corresponding to the target read voltages after multiple adjustments are all failed states, or the plurality of first results are all greater than the first preset value, increasing the step size corresponding to the first adjustment. In some implementations, the method may include, when an increased step size of the first adjustment exceeds a third preset value, decreasing an amount of reading on the specified data stored at the target location.

In some implementations, the method may include obtaining a first preset value. In some implementations, the first preset value may be obtained in accordance with historical data, and less than or equal to an upper limit of a fail bit count supported by the memory device.

In some implementations, the method may include, before obtaining the first result corresponding to the target location at the initial target read voltage, setting a read mode of the memory device to a single level read mode. In some implementations, the single level read mode may include reading at least one bit of storage data stored in the memory cell with read voltages at one level.

In some implementations, the memory cell in an array of memory cells includes M bits, the memory device includes M-type pages, and the memory cell with M bits reads its M bits of storage data with read voltages at N levels. In some implementations, the M and N are both integers greater than 1, and $N=2^M-1$. In some implementations, the method may include, for read voltages at each level of the read voltages at multiple levels corresponding to each type of page, determine the valley voltage at each level in accordance with the plurality of first results corresponding to multiple read voltages at each level.

According to still a further aspect of the present disclosure, a method for operating a memory system is provided. The method may include, before performing a read operation on data stored in a memory device of the memory system, sending a first instruction. The first instruction may indicate to obtain a valley voltage. The valley voltage may be obtained according to a method for operating a memory device. The method for operating the memory device may include obtaining a first result corresponding to a target location in an array of memory cells in the memory device at an initial target read voltage. The first result may include information which represents a number of bits at the target location which are flipped in a result of reading at the target read voltage relative to specified data which is actually stored. The specified data may be stored at the target location. The method for operating the memory device may include performing multiple adjustments to the initial target read voltage, and obtaining the first result corresponding to the target location at the target read voltage after each of the multiple adjustments respectively. The method for operating the memory device may include determining a valley voltage in accordance with a plurality of the obtained first results. The valley voltage may be a read voltage for performing a read operation on the array of memory cells. The method for operating the memory device may include performing a read operation on data stored in the memory device in accordance with the valley voltage. The method for operating the memory device may include performing an error correction code decoding operation on a read result of the read operation.

According to still another aspect of the present disclosure, a method for operating a memory system is provided. The method may include obtaining a first result corresponding to a target location in an array of memory cells in a memory device at an initial target read voltage. The first result may include information which represents a number of bits at the target location which are flipped in a result of reading at the target read voltage relative to specified data which is actually stored. The specified data may be stored at the target location. The method may include performing multiple adjustments to the initial target read voltage, and obtaining the first result corresponding to the target location at the target read voltage after each of the multiple adjustments respectively. The method may include determining a valley voltage in accordance with a plurality of the obtained first results. The valley voltage may be a read voltage for performing a read operation on the array of memory cells.

In some implementations, the method may include sending a second instruction before performing a read operation on data stored in the memory device. The second instruction may indicate to obtain a plurality of first results corresponding to the target location at multiple different target read voltages. The method may include determining a valley voltage in accordance with the plurality of first results respectively corresponding to multiple different read voltages. The method may include performing a read operation on data stored in the memory device in accordance with the valley voltage.

In some implementations, the method may include reading the specified data stored at the target location at the initial target read voltage to obtain a second result. In some implementations, the method may include performing a logical operation on the stored specified data and the second result to obtain a third result. In some implementations, the method may include, when the first result includes the number of bits which represents the number of bits at the target location which are flipped in a result of reading at the target read voltage relative to specified data which is actually stored, counting the number of bits in the third result that represent flip of bits in the second result relative to the specified data, and taking the result of counting to be the first result. In some implementations, the method may include, when the first result includes information which represents a relationship of size between the number of bits at the target location which are flipped in a result of reading at the target read voltage relative to specified data which is actually stored and a first preset value, comparing the number of bits in the third result that represent flip of bits in the second result relative to the specified data with a first preset value, and taking the result of comparing to be the first result.

According to yet another aspect of the present disclosure, a memory device is provided. The memory device may include an array of memory cells including a plurality of memory cells. The memory device may include a peripheral circuit coupled to the array of memory cells. The peripheral circuit may include a page buffer. The peripheral circuit may include control logic configured to store specified data in a first latch of the page buffer. The peripheral circuit may include control logic configured to read the specified data stored in the first latch at a target read voltage to obtain a second result, and store the second result in a second latch of the page buffer. The peripheral circuit may include control logic configured to perform a logical operation on the stored specified data and the second result to obtain a third result, and store the third result in a third latch of the page buffer. The peripheral circuit may include control logic configured to, when the first result includes a number of bits which represents the number of bits at a target location which are flipped in a result of reading at the target read voltage relative to specified data which is actually stored, count the number of bits in the third result that represent flip of bits in the second result relative to the specified data, and take the result of counting to be the first result. The peripheral circuit may include control logic configured to, when the first result includes information which represents a relationship of size between the number of bits at the target location which are flipped in a result of reading at the target read voltage relative to specified data which is actually stored and a first preset value, compare the number of bits in the third result that represent flip of bits in the second result relative to the specified data with a first preset value, and take the result of comparing to be the first result.

According to yet a further aspect of the present disclosure, a method for operating a memory device is provided. The method may include storing specified data in a first latch of a page buffer. The method may include reading the specified data stored at a target location at a target read voltage to obtain a second result, and storing the second result in a second latch of the page buffer. The method may include performing a logical operation on the stored specified data and the second result to obtain a third result, and storing the third result in a third latch of the page buffer. The method may include, when the first result includes a number of bits which represents the number of bits at the target location which are flipped in a result of reading at the target read voltage relative to specified data which is actually stored, counting the number of bits in the third result that represent flip of bits in the second result relative to the specified data, and taking the result of counting to be the first result. The method may include, when the first result includes information which represents a relationship of size between the number of bits at the target location which are flipped in a result of reading at the target read voltage relative to specified data which is actually stored and a first preset value, comparing the number of bits in the third result that represent flip of bits in the second result relative to the specified data with a first preset value, and taking the result of comparing to be the first result.

BRIEF DESCRIPTION OF THE DRAWINGS

In the accompanying drawings, unless otherwise specified, same reference numbers refer to same or similar parts or elements throughout multiple accompanying drawings. The accompanying drawings are not necessarily to scale. It should be understood that these accompanying drawings depict only some examples disclosed in accordance with the present application and should not be considered as limiting the scope of the present application.

DETAILED DESCRIPTION

Figure 1:
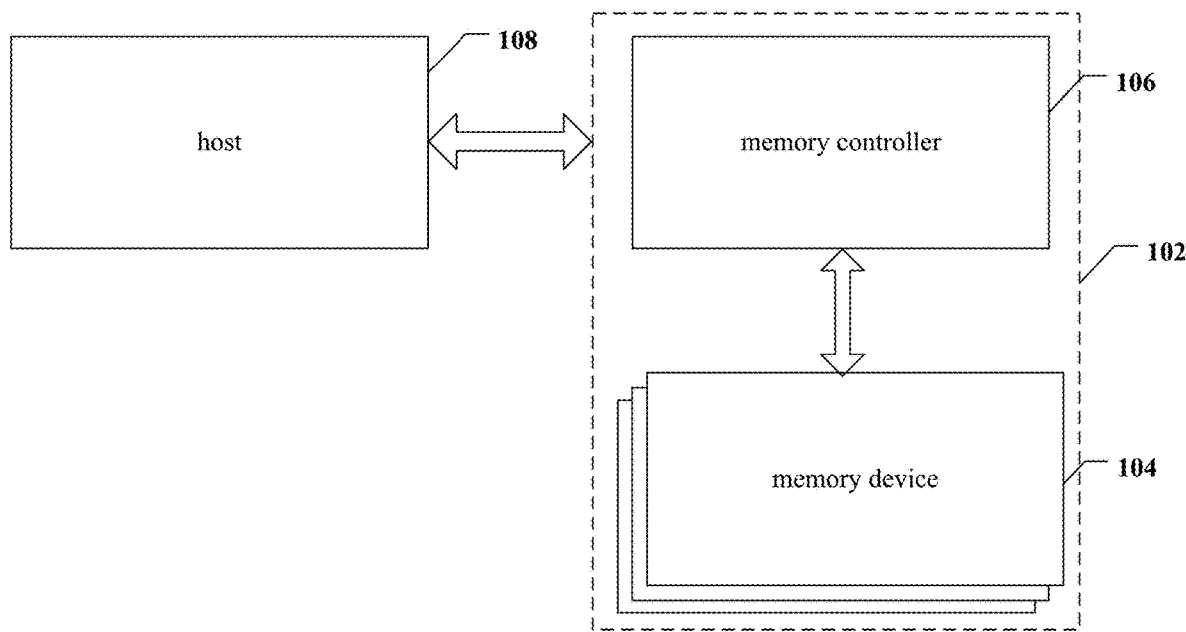
FIG. 1 is a schematic diagram of an example system including a memory system of an example according to the present application.

Example implementations disclosed in the present application will be described in more detail below with reference to the accompanying drawings. Although example implementations of the present application are shown in the accompanying drawings, it should be understood that the present application may be implemented in various forms and should not be limited to the implementations set forth herein. Rather, these examples are provided so that the present application can be more thoroughly understood and the scope of the present application can be fully conveyed to those skilled in the art.

In the following description, numerous specific details are given in order to provide a more thorough understanding of the present application. However, it will be apparent to one skilled in the art that the present application may be practiced without one or more of these details. In other examples, in order to avoid confusion with the present application, some technical features known in the art are not described; that is, not all features of the actual example are described here, and well-known functions and structures are not described in detail.

Furthermore, accompanying drawings are merely schematic illustrations of the present application and are not necessarily drawn to scale. Same reference numerals in the accompanying drawings represent same or similar parts, and thus repeated description thereof will be omitted. Some of the block diagrams shown in the accompanying drawings are functional entities and do not necessarily correspond to physically or logically separate entities. These functional entities may be implemented in software form, or implemented in one or more hardware modules or integrated circuits, or implemented in different networks and/or processor devices and/or microcontroller devices.

The flowcharts shown in the accompanying drawings are illustrative only and do not necessarily include all operations. For example, some operations may be decomposed, and some operations may be merged or partially merged, thus the actual order of execution may change according to the actual situation.

A term used herein is for the purpose of describing a particular example only and is not to be considered as limitation of the present application. As used herein, the singular forms "a", "an" and "said/the" are intended to include the plural forms as well, unless the context clearly dictates otherwise. It should also be understood that the terms "consists of" and/or "comprising", when used in this description, identify the presence of stated features, integers, operations, operations, elements and/or parts, but do not exclude the presence of one or more other features, integers, operations, operations, elements, parts and/or groups. As used herein, the term "and/or" includes any and all combinations of the associated listed items.

Memory devices in examples of the present application include but are not limited to a three-dimensional NAND memory, and for ease of understanding, a three-dimensional NAND memory is used as an example for illustration.

FIG. 1 illustrates a block diagram of an example system 100 with memory devices in accordance with some aspects of the present application. The system 100 may be a mobile phone, a desktop computer, a laptop computer, a tablet, a vehicle computer, a gaming console, a printer, a positioning device, a wearable electronic device, a smart sensor, a Virtual Reality (VR) device, an Augment Reality (AR) device, or any other suitable electronic devices having memory device therein. As shown in in FIG. 1, system 100 may include a host 108 and a memory system 102, and the memory system 102 has one or more memory devices 104 and a memory controller 106. The host 108 may be a processor of an electronic device (e.g., a Central Processing Unit (CPU)) or a System of Chip (SoC) (e.g., an Application Processor (AP)). Host 108 may be configured to send data to or receive data from memory device 104.

According to some implementations, memory controller 106 is coupled to memory device 104 and host 108 and is configured to control memory device 104. Memory controller 106 may manage data stored in memory device 104 and communicate with host 108. In some implementations, the memory controller 106 is designed to operate in low duty cycle environments, e.g., Secure Digital (SD) card, Compact Flash (CF) card, Universal Serial Bus (USB) flash drive, or other media for use in electronic devices such as personal computer, digital camera, mobile phone, etc.

In some implementations, the memory controller 106 is designed to operate in high duty cycle environment Solid State Drive (SSD) or Embedded Multi Media Card (eMMC), where SSD or eMMC is used as data storage for mobile devices such as smartphone, tablet computer, laptop computer, and enterprise storage array.

Memory controller 106 may be configured to control operations of memory device 104, e.g., read, erase and program operations. Memory controller 106 may also be configured to manage various functions related to data stored or to be stored in memory device 104, including but not limited to bad block management, garbage collection, logical-to-physical address translation, wear leveling, etc. In some implementations, memory controller 106 is also configured to process error correction code related to data read from or written to memory device 104.

The memory controller 106 may also perform any other suitable functions, e.g., formatting the memory device 104. Memory controller 106 may communicate with external devices (e.g., host 108) according to a particular communication protocol. For example, the memory controller 106 may communicate with external devices through at least one of various interface protocols, such as USB protocol, MMC protocol, Peripheral Component Interconnect (PCI) protocol, PCI Express (PCI-E) protocol, Advanced Technology Attachment (ATA) protocol, Serial ATA protocol, Parallel ATA protocol, Small Computer Small Interface (SCSI) protocol, Enhanced Small Disk Interface (ESDI) protocol, Integrated Drive Electronics (IDE) protocol, Firewire protocol, etc.

The memory controller 106 and one or more memory device 104 may be integrated into various types of storage devices, e.g., included in the same package (e.g., Universal Flash Storage (UFS) package or eMMC package). That is, memory system 102 may be implemented and packaged into different types of end electronic products.

Figure 2A:
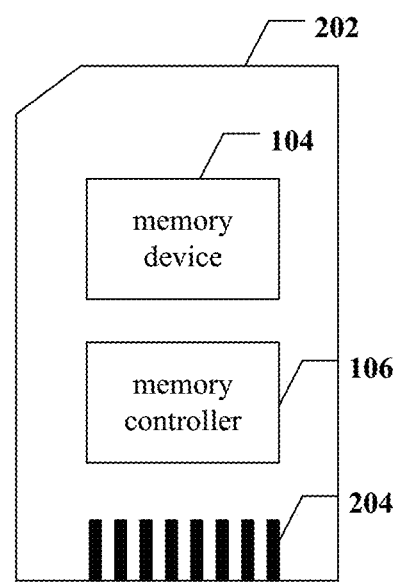
FIG. 2a is a schematic diagram of an example memory card including a memory system according to an example of the present application.

In one example as shown in FIG. 2a, memory controller 106 and a single memory device 104 may be integrated into a memory card 202. Memory card 202 may include a PC card (PCMCIA, personal computer memory card international association), a CF card, a smart media (SM) card, a memory stick, a multimedia card (MMC, RS-MMC, MMC-micro), an SD card (SD, miniSD, microSD, SDHC), a UFS, etc. Memory card 202 may further include a memory card connector 24 coupling memory card 202 with a host (e.g., host 108 in FIG. 1).

Figure 2B:
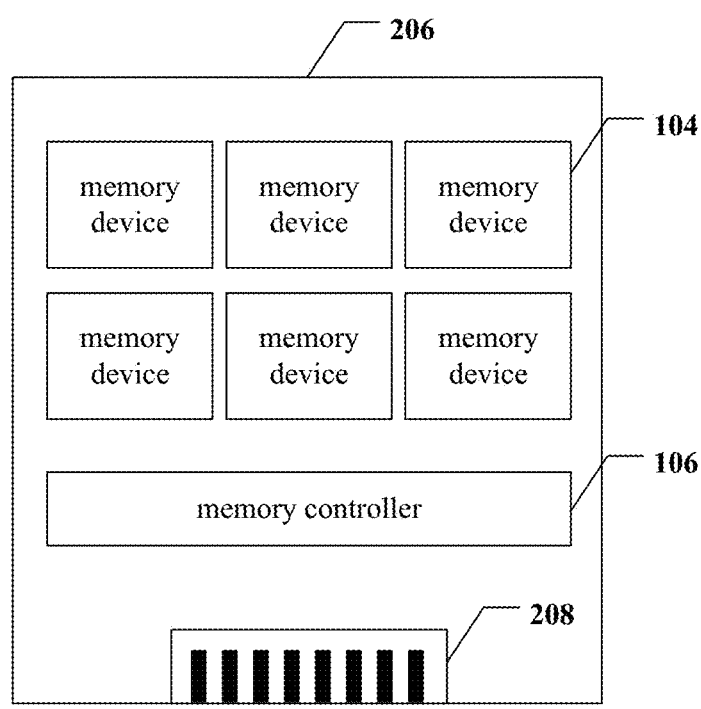
FIG. 2b is a schematic diagram of an example solid state drive including a memory system according to an example of the present application.

In another example as shown in FIG. 2b, memory controller 106 and multiple memory devices 104 may be integrated into a SSD 206. SSD 206 may further include an SSD connector 208 coupling the SSD 206 with a host (e.g., host 108 in FIG. 1). In some implementations, at least one of the storage capacity or operating speed of SSD 206 is greater than at least one of the storage capacity or operating speed of memory card 202.

Figure 3A:
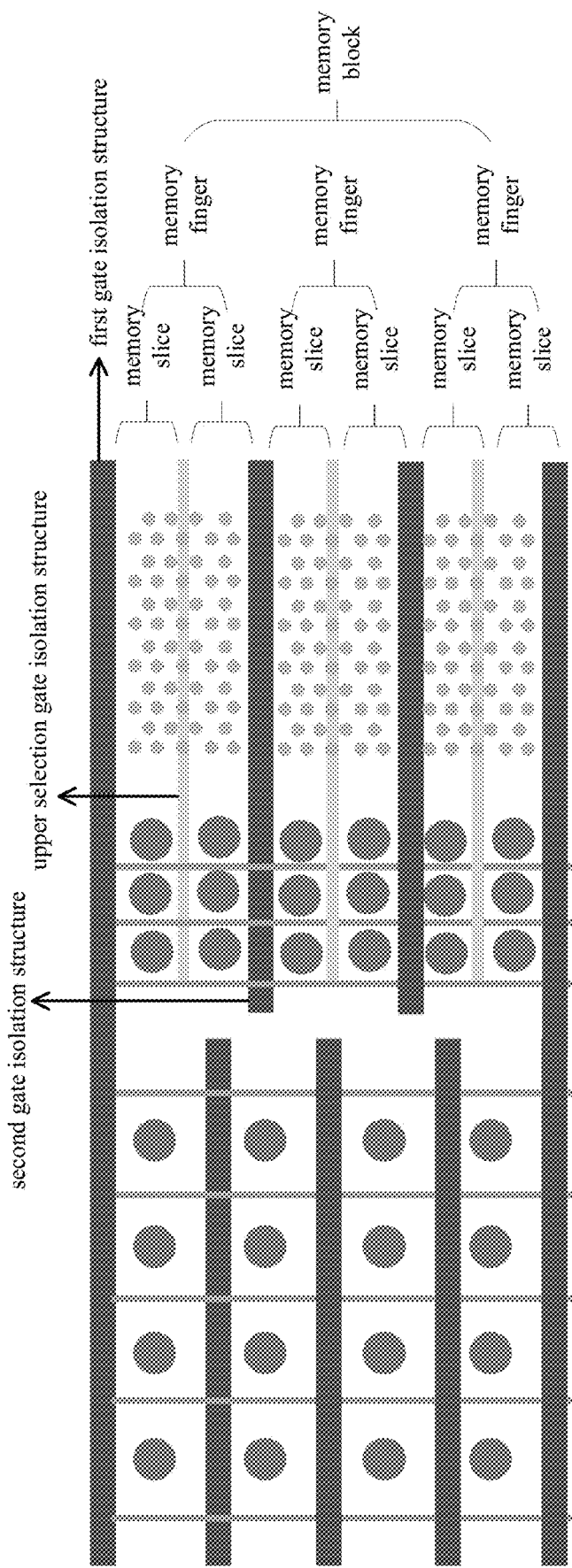
FIG. 3a is a schematic diagram of the distribution of memory cells of a three-dimensional NAND memory according to an example of the present application.

In one example, FIG. 3a provides a schematic structure diagram of an array of memory cells of a three-dimensional NAND memory, and as shown in FIG. 3a, the array of memory cells of the three-dimensional NAND memory is composed of several rows of memory cell rows parallel to the gate isolation structure and staggered in parallel, every two memory cell rows are separated by a gate isolation structure and an upper selection gate isolation structure, and each memory cell row includes a plurality of memory cells. The gate isolation structure may include a first gate isolation structure and a second gate isolation structure, the first gate isolation structure divides the array of memory cells into multiple blocks, and multiple second gate isolation structures divides a block into multiple memory fingers, an upper selection gate isolation structure provided in the middle of each memory finger may divide the memory finger into two parts, thereby dividing the memory finger into two memory slices. A memory block shown in FIG. 3a includes 6 memory slices, and in practical applications, the number of memory slices in a memory block is not limited to this.

In some examples, multiple word lines may be coupled to each block, and a plurality of memory cells coupled to each individually controlled word line may form a page, e.g., all memory cells in each memory slice in FIG. 3a are coupled to form a page.

It should be noted that the number of memory cell rows between the gate isolation structure and the upper selection gate isolation structure shown in FIG. 3a is just an example demonstration, and is not used to limit the number of memory cell rows included in a memory finger of the three-dimensional NAND memory in the present application. In practical applications, the number of memory cell rows included in a memory finger may be adjusted according to actual conditions, such as 2, 4, 8, 16, etc.

Figure 3B:
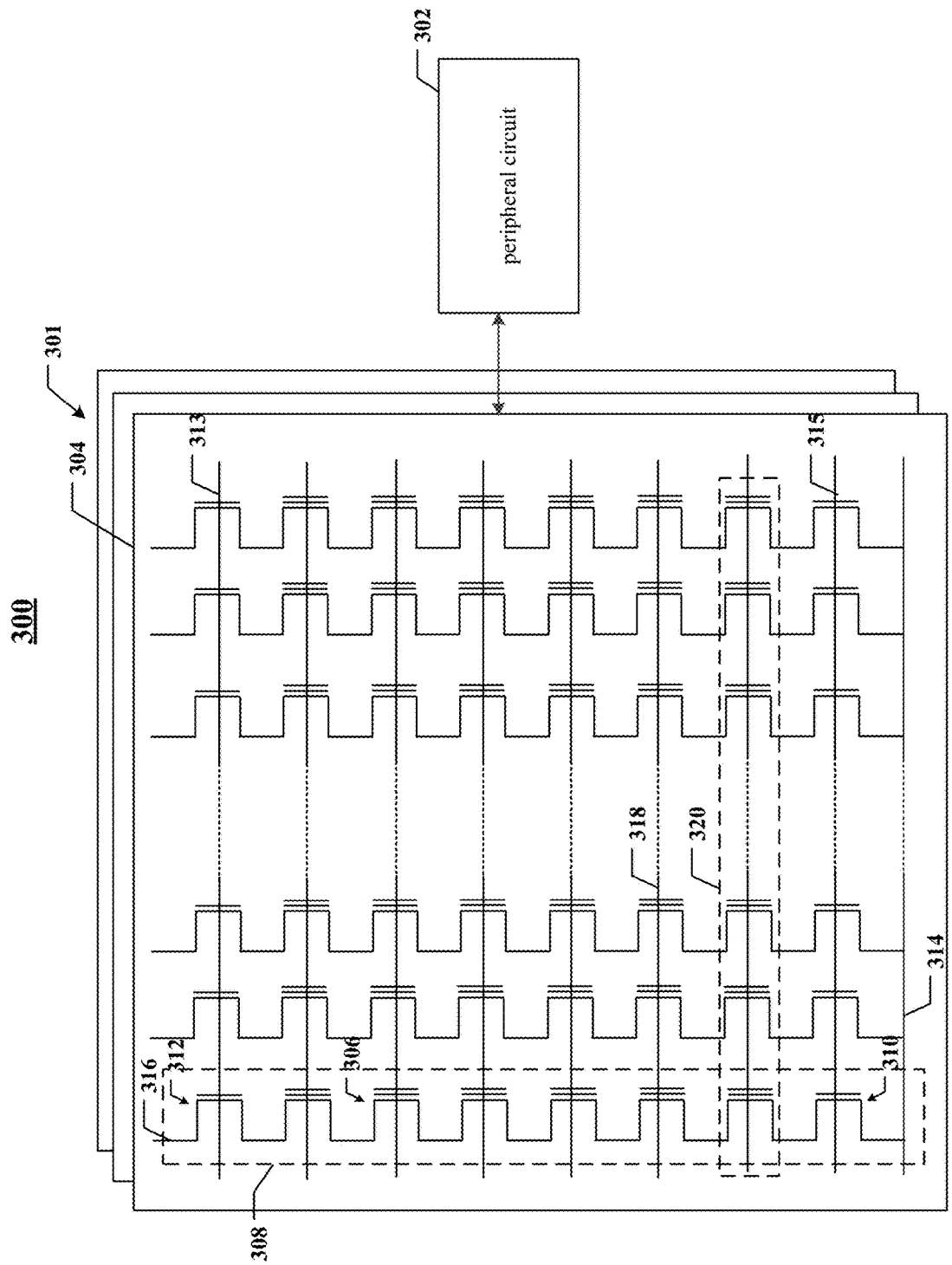
FIG. 3b is a schematic diagram of an example memory including peripheral circuits according to an example of the present application.

FIG. 3b illustrates a schematic circuit diagram of an example memory device 300 including peripheral circuitry according to some aspects of the present application. Memory device 300 may be an example of memory device 104 in FIG. 1. The memory device 300 may include an array of memory cells 301 and a peripheral circuit 302 coupled to the array of memory cells 301. By way of example and not limitation, memory cell array 301 may be a three-dimensional NAND memory cell array, memory cells 306 may be a NAND-type memory cell, and memory cells 306 may be provided in the form of an array of memory strings 308. Each memory string 308 may extend vertically over a substrate (not shown). In some implementations, each memory string 308 includes a plurality of memory cells 306 coupled in series and stacked vertically. Each memory cell 306 may retain a continuous analog value, e.g., voltage or charge, depending on the number of electrons trapped within the area of the memory cell 306. Each memory cell 306 may be a "floating gate" type memory cell including a floating gate transistor, or a "charge trap" type memory cell including a charge trap transistor.

In some implementations, each memory cell 306 is a Single-level Cell (SLC) that has two possible storage states and may thus store one bit of data. For example, a first storage state of "0" may correspond to a first voltage range, and a second storage state of "1" may correspond to a second voltage range. In some implementations, each memory cell 306 is a Multi-Level Cell (MLC) capable of storing more than a single bit of data in more than four storage states. For example, an MLC may store two bits per cell (also known as a Double-Level Cell), three bits per cell (also known as a Trinary-Level Cell (TLC)), four bits per cell (also known as a Quad-Level Cell (QLC)), five bits per cell (also known as a Penta-level cell (PLC)), or more than five bits per cell. Each MLC can be programmed to assume a range of possible nominal storage values. In one example, if each MLC stores two bits of data, the MLC can be programmed to assume one of three possible programming levels from the erased state through writing one of three possible nominal storage values into the cell, a fourth nominal storage value may be used for the erase state.

It should be noted that the storage state mentioned here is also the storage state of the memory cell mentioned in this application. Different memory cells have different numbers of storage states, e.g., a SLC type memory cell has 2 storage states (e.g., two memory states). The 2 storage states include a programming state and an erase state. As another example, an MLC type memory cell has 4 storage states. The four storage states include one erase state and three programming states. As yet another example, a TLC type memory cell has 8 storage states. The 8 storage states include one erase state and seven programming states. In some implementations, the QLC type memory cell has 16 storage states. The 16 storage states include one erase state and fifteen programming states.

As shown in FIG. 3b, each memory string 308 may include a bottom-select gate (BSG) 310 (also referred to as a source-side-select gate) at its source terminal and a top select gate (TSG) 312 (also referred to as a drain-side-select gate) at its drain terminal. BSG 310 and TSG 312 may be configured to activate the selected memory cell string 308 during read operation and program operation. In some implementations, the sources of memory strings 308 in a same memory block 304 are coupled through a same source line (SL) 314 (e.g., a common SL). In other words, according to some implementations, all memory strings 308 in a same memory block 304 have an array common source (ACS). According to some implementations, TSG 312 of each memory string 308 is coupled to a corresponding bit line (BL) 316 from which data may be read or written via an output bus (not shown). In some implementations, each memory string 308 is configured to be selected or deselected through at least one of applying a select voltage (e.g., above the threshold voltage of a transistor with a TSG 312) or a deselect voltage (e.g., 0V) to the corresponding TSG 312 via one or more TSG lines 313 or applying a select voltage (e.g., above the threshold voltage of a transistor with a BSG 310) or a deselect voltage (e.g., 0V) to the corresponding BSG 310 via one or more BSG lines 315.

As also shown in FIG. 3b, a memory string 308 may be organized into a plurality of memory blocks 304 each of which may have a common source line 314 (e.g., coupled to ground). In some implementations, each memory block 304 is the basic data unit for an erase operation, e.g., all memory cells 306 on the same memory block 304 are erased simultaneously. To erase the memory cell 306 in the selected memory block 304, the source line 314 coupled to the selected memory block 304 and to the unselected memory blocks 304 in the same plane as the selected memory block 304 may be biased with an erase voltage (Vers) (e.g., a high positive voltage (e.g., 20V or higher)). It should be understood that, in some examples, erase operations may be performed at the half-memory block level, at the quarter-memory block level, or at a level with any suitable number of memory blocks or any suitable fraction of memory blocks. The memory cells 306 of adjacent memory strings 308 may be coupled through a word line 318 that selects which row of memory cells 306 is affected by read and program operations. In some implementations, combined with the above FIG. 3a, a plurality of memory cells are isolated by an upper selection gate isolation structure and a gate isolation structure, and a plurality of memory cells between the upper selection gate isolation structure and the gate isolation structure are arranged into multiple memory cell rows, and each memory cell row is parallel to the gate isolation structure and the upper selection gate isolation structure. The memory cells in the memory slice that share a same word line form a physical page 320, each physical page 320 may be mapped to at least one logical page according to the storage mode of the corresponding memory cell 306 (e.g., SLC or MLC as mentioned above), a logical page may form the basic data unit for program operation and read operation.

Referring to FIGS. 3a and 3b, each memory cell 306 of the plurality of memory cells is coupled to a corresponding word line 318, and each memory string 308 is coupled to a corresponding bit line 316 through a corresponding select transistor (e.g., top select transistor (TSG) 312).

Figure 4:
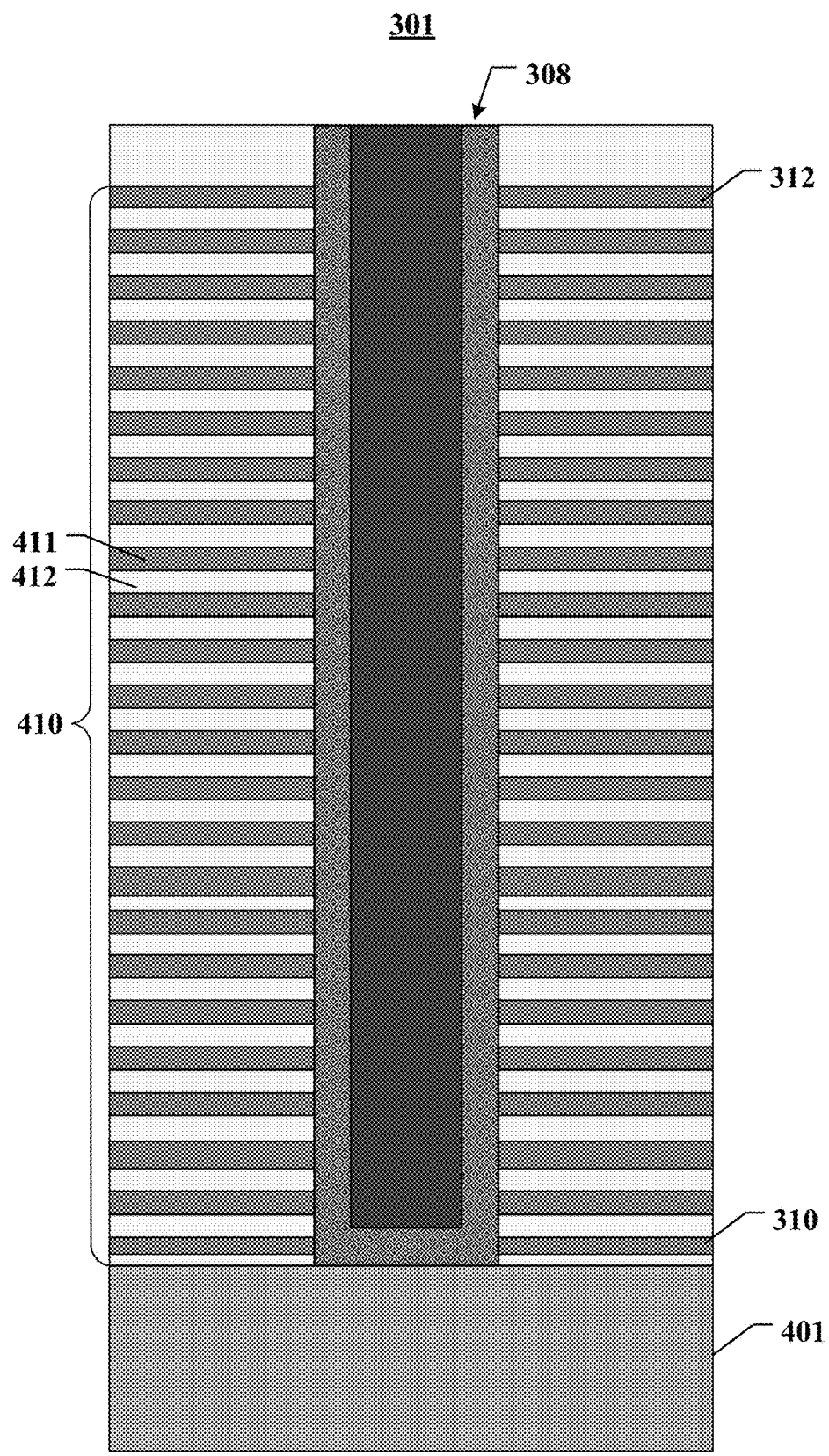
FIG. 4 is a schematic cross-sectional view of an array of memory cells including NAND-type memory strings according to an example of the present application.

FIG. 4 illustrates a schematic cross-sectional view of an example memory cell array 301 including memory strings 308, e.g., NAND, according to some aspects of the present application. As shown in FIG. 4, the NAND memory cell array 301 may include a stacked structure 410, the stacked structure 410 includes multiple gate layers 411 and multiple insulating layers 412 alternately stacked in sequence, and the channel structure vertically penetrating through the gate layers 411 and the insulating layers 412. The channel structure is coupled to each gate layer to form a memory cell, and the channel structure is coupled to multiple gate layers in the stacked structure 410 to form the memory string 308. Gate layers 411 and the insulating layers 412 may be stacked alternately, and two adjacent gate layers 411 are separated by an insulating layer 412.

A constituent material of the gate layer 411 may include a conductive material. Conductive materials include, but are not limited to, tungsten (W), cobalt (Co), copper (Cu), aluminum (Al), polysilicon, doped silicon, silicide, or any combination thereof. In some examples, each gate layer 411 includes a metal layer, e.g., a tungsten layer. In some examples, each gate layer 411 includes a doped polysilicon layer. Each gate layer 411 may include a control gate surrounding a memory cell. A gate layer 411 at the top of a stacked structure 410 may extend laterally as an upper selection gate line, a gate layer 411 at the bottom of a stacked structure 410 may extend laterally as a lower selection gate line, and a gate layer 411 extending laterally between an upper selection gate line and a lower selection gate line may serve as a word line layer.

In some examples, a stacked structure 410 may be disposed on a substrate 401. The substrate 401 may include silicon (e.g., monocrystalline silicon), silicon germanium (SiGe), gallium arsenide (GaAs), germanium (Ge), silicon-on-insulator (SOI), germanium-on-insulator (GOI), or any other appropriate material.

In some examples, a memory string 308 includes a channel structure extending vertically through stacked structure 410. In some implementations, a channel structure includes a channel hole filled with semiconductor material(s) (e.g., as a semiconductor channel) and dielectric material(s) (e.g., as a memory film). In some implementations, a semiconductor channel includes silicon, e.g., polysilicon. In some implementations, a memory film is a composite dielectric layer including a tunneling layer, a storage layer (also referred to as a "charge trapping/storage layer"), and a blocking layer. A channel structure may have a cylindrical shape (e.g., a pillar shape). According to some implementations, a semiconductor channel, a tunneling layer, a storage layer and a blocking layer are radially arranged in this order from the center of the pillar toward the outer surface of the pillar. A tunneling layer may include silicon oxide, silicon oxynitride, or any combination thereof. A storage layer may include silicon nitride, silicon oxynitride, or any combination thereof. A barrier layer may include silicon oxide, silicon oxynitride, a high-k (high-k) dielectric, or any combination thereof. In an example, a memory film may include a composite layer of silicon oxide/silicon oxynitride/silicon oxide (ONO).

Figure 5:
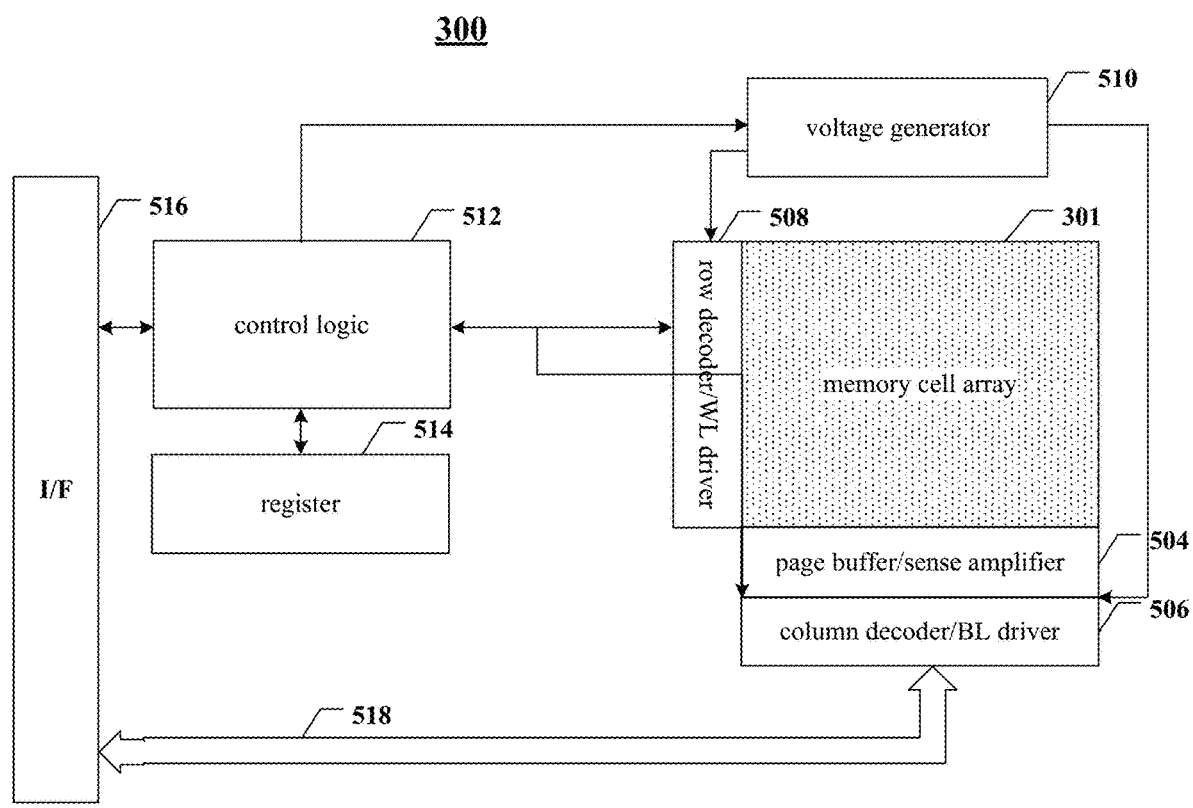
FIG. 5 is a schematic diagram of an example memory device including an array of memory cells and peripheral circuits according to an example of the present application.

Referring back to FIG. 3b, the peripheral circuit 302 may be coupled to the array of memory cells 301 through bit line 316, word line 318, source line 314, BSG line 315, and TSG line 313. The peripheral circuit 302 may include any suitable analog, digital, and mixed-signal circuitry for facilitating operation of the array of memory cells 301 through applying at least one of a voltage signal or a current signal to and sensing at least one of voltage signal or current signal from each target memory cell 306 via bit line 316, word line 318, source line 314, BSG line 315, and TSG line 313. The peripheral circuit 302 may include various types of peripheral circuits formed with metal-oxide-semiconductor (MOS) technology. For example, FIG. 5 illustrates some example peripheral circuits, the peripheral circuit includes page buffer/sense amplifier 504, column decoder/bit line driver 506, row decoder/word line driver 508, voltage generator 510, control logic 512, register 514, interface 516 and data bus 518. It should be understood that in some examples, additional peripheral circuits not shown in FIG. 5 may also be included.

The page buffer/sense amplifier 504 may be configured to read data from and program (write) data to the array of memory cells 301 according to control signals from the control logic 512. In one example, the page buffer/sense amplifier 504 may store programming data (written data) to be programmed into the array of memory cells 301. In another example, the page buffer/sense amplifier 504 may perform a programming verify operation to ensure that data has been correctly programmed into memory cell 306 coupled to selected word line 318. In yet another example, the page buffer/sense amplifier 504 may also sense a low power signal from bit line 316 representing a data bit stored in memory cell 306 and amplify a small voltage swing to a recognizable logic level during a read operation. The column decoder/bit line driver 506 may be configured to be controlled by control logic 512 and to select one or more memory strings 308 through applying a bit line voltage generated from voltage generator 510.

The row decoder/word line driver 508 may be configured to be controlled by control logic 512 and select/deselect memory block 304 of memory cell array 301 and select/deselect word line 318 of memory block 304. The row decoder/word line driver 508 may also be configured to drive word line 318 with a word line voltage generated from voltage generator 510. In some implementations, the row decoder/word line driver 508 may also select/deselect and drive the BSG line 315 and the TSG line 313. As described in detail below, the row decoder/word line driver 508 is configured to perform programming operations on the memory cells 306 coupled to the selected word line 318. The voltage generator 510 may be configured to be controlled by the control logic 512, and generate word line voltage (e.g., read voltage, programming voltage, pass voltage, channel boost voltage, verify voltage, etc.), bit line voltage and source line voltage to be supplied to the array of memory cells 301.

The control logic 512 may be coupled to each of other portions of the peripheral circuit described above and configured to control operations of each of the other portions of the peripheral circuit. The register 514 may be coupled to the control logic 512 and include status register, command register and address register for storing status information, command operation code (OP code) and command address for controlling operations of each of the peripheral circuits. The interface 516 may be coupled to control logic 512 and act as a control buffer to buffer and relay control commands received from a host (not shown) to control logic 512 and to buffer and relay status information received from the control logic 512 to the host. Interface 516 may also be coupled to column decoder/bit line driver 506 via data bus 518 and act as a data I/O interface and data buffer to buffer and relay data to/from memory cell array 301.

The basic principle of three-dimensional NAND memory is that carriers (electrons or holes) cross the charge barrier and inject a certain amount of charge into the memory cell to complete the process of data write, the storage data may then be read in accordance with the threshold voltage when the memory cell is turned on. Therefore, in order to read correct data, an ECC error correction algorithm with strong error correction capability and high efficiency is usually introduced when reading data.

However, as the use time increases, the charge stored in the memory cell will change with the increase in use time, repeated read operations, cross temperature, etc., therefore affecting the accuracy of data reading. When the threshold voltage shifts upward or downward significantly, when the original read voltage is used to read data in the memory cell, the possibility of occurring read error will be very high, and a read error exceeding the ECC error correction capability will also cause data read of the memory cell to fail.

Figure 6:
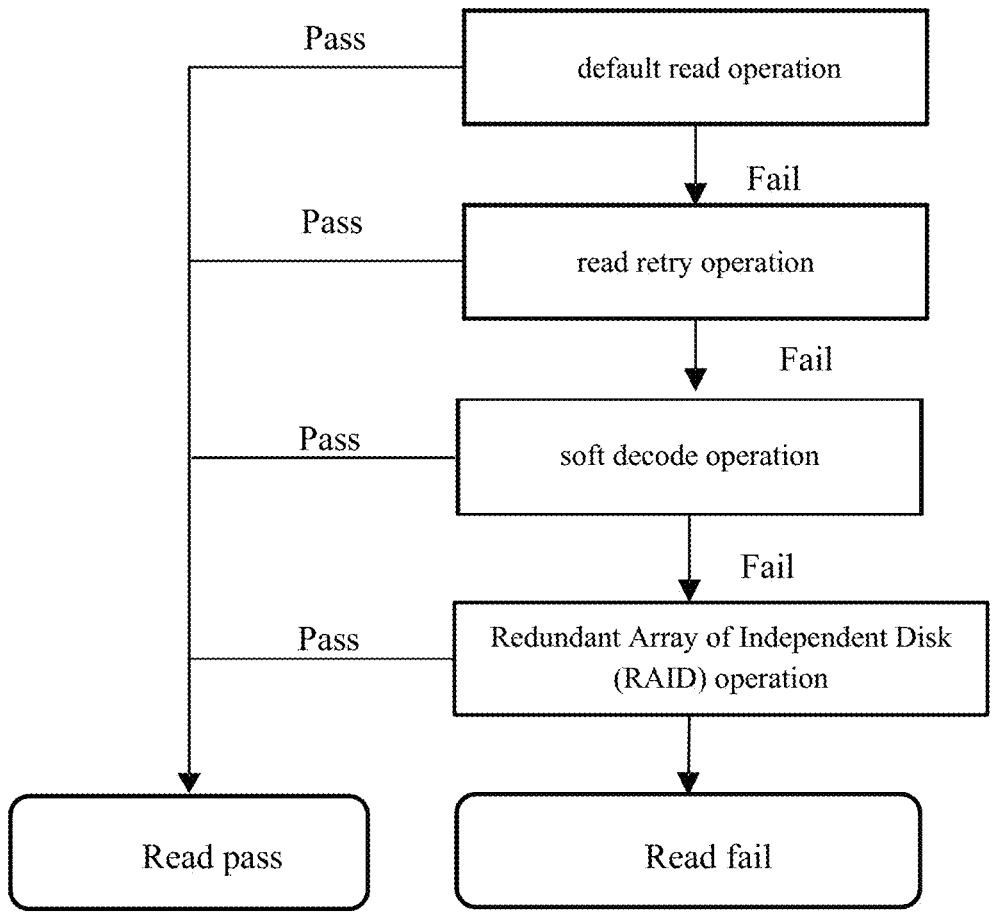
FIG. 6 is a schematic diagram of an example flow of a read operation on a memory system provided by the present application.

FIG. 6 illustrates a schematic diagram of an example read operation flow of a memory system. Combined with what is shown in FIG. 6, when the memory controller controls the memory device to perform a read operation, a default read operation (FW) is first performed on the memory cell at the corresponding physical address; if the default read operation fails, a read-retry operation is performed; after the read-retry operation fails, a soft decode operation is performed; after the soft decode fails, a Redundant Array of Independent Disk (RAID) operation is performed; and after the RAID operation fails, the read operation stops and the read fails because the error cannot be corrected, then the memory controller sends a read fail signal to the host 108. Read-retry operation and default read operation may be applicable to hard decode.

In some implementations, the read-retry operation may usually be performed through querying the retry table provided by the manufacturer. The essence of the read-retry operation is an error-correction mechanism, the retry table may provide a reference voltage for reading data, which attempts to read each memory cell again with a read voltage that deviates from the normal threshold voltage through querying the retry table, combined with ECC error correction algorithm for error correction, thereby attempting to read data correctly. If the erroneous read data is corrected, query for the retry table is stopped. If the erroneous read data cannot be corrected, the retry table will be queried until the entire retry table is traversed.

The read-retry operation described above requires querying the retry table one-by-one, which will inevitably increase the number of retry and take a long time. In addition, the retry provided by the manufacturer is only a reference value in some specific environments, and the real usage scenarios are ever-changing; therefore, many scenarios cannot be covered by the retry table provided by the manufacturer. That is, even if the retry table is traversed, the data may not be corrected, resulting in a lot of wasted time processing the command. In summary, the method of performing read-retry operation through repeatedly polling the retry table takes a long time, affects the response time of subsequent commands, and thus affects the performance of the device.

Based on one or more of the problems described above, an example of this application proposes a method for operating a memory device.

Figure 7:
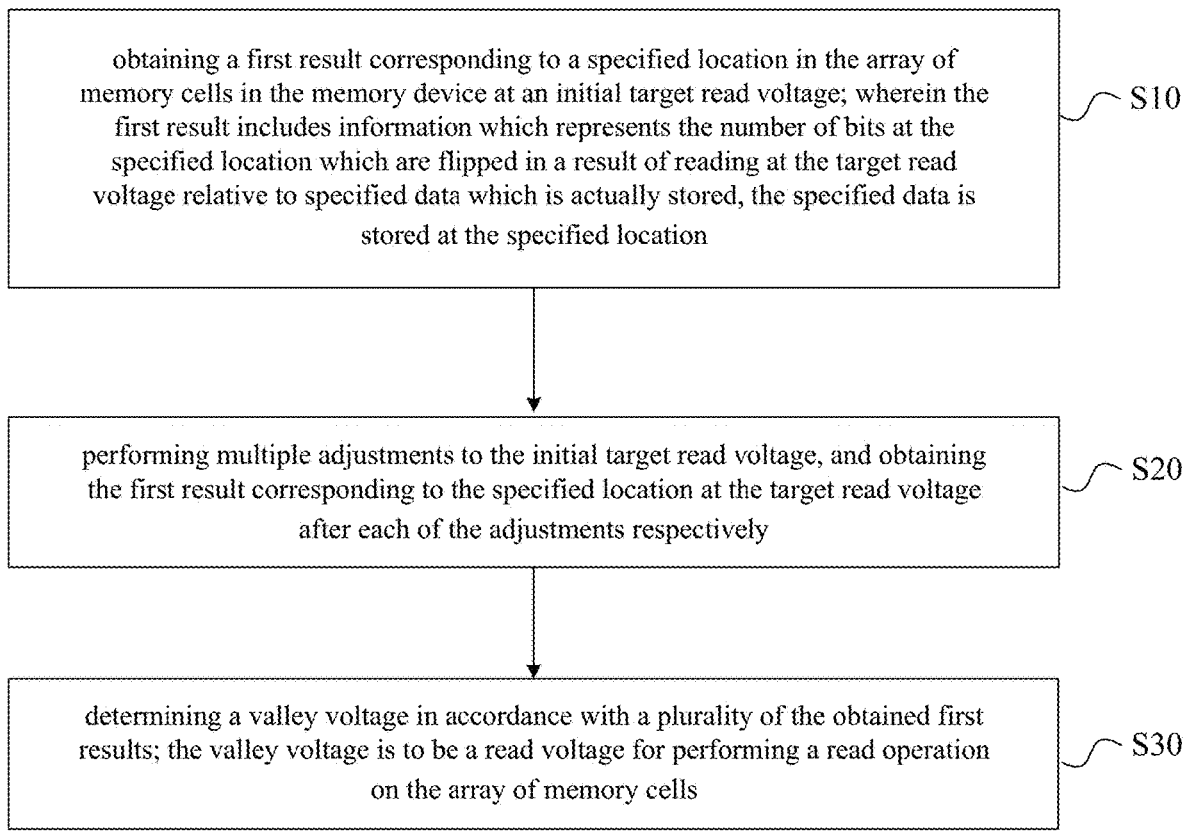
FIG. 7 is a schematic flowchart of an implementation of a method for operating a memory device provided by an example of the present application.

FIG. 7 is a schematic flowchart of an implementation of a method for operating a memory device provided by an example of the present application. As shown in FIG. 7, in some examples, the method for operating a memory device includes the following operations.

For example, referring to FIG. 7, at operation S10, the method may include obtaining a first result corresponding to a target location in the array of memory cells in the memory device at an initial target read voltage. The first result includes information which represents the number of bits at the target location which are flipped in a result of reading at the target read voltage relative to specified data which is actually stored, the specified data is stored at the target location.

At operation S20, the method may include performing multiple adjustments to the initial target read voltage, and obtaining the first result corresponding to the target location at the target read voltage after each of the multiple adjustments respectively.

At operation S30, the method may include determining a valley voltage in accordance with a plurality of the obtained first results. The valley voltage may be a read voltage for performing a read operation on the array of memory cells.

Here, the structure of the memory device refers to FIG. 3b described above and will not be repeated here.

In some examples, the array of memory cells includes a plurality of memory blocks, each of the memory blocks includes a plurality of memory rows, each of the memory rows includes a plurality of memory cells, a preset number of the memory cells form a code word (CW).

Here, the memory row may be understood by referring to the structure and description of the physical page 320 in FIG. 3b, and the structure of the array of memory cells refers to FIG. 3a and FIG. 3b described above, which will not be repeated here.

Here, a preset number of the memory cells form a code word.

In some examples, the number of memory cells contained in the code word is the same as the number of memory cells contained in one encoding or decoding when error correction encoding or decoding is being performed. In some examples, the number of memory cells contained in a code word may be less than or equal to the number of memory cells coupled to a physical page, e.g., the number of memory cells contained in a code word is ¼ of the number of memory cells coupled to a physical page. In some examples, a code word may include a number ranging from $2^4$ to $2^{12}$ memory cells. In some examples, a code word may include $2^4$, $2^8$, or $2^{12}$ memory cells.

In general, different memory systems may choose code words of different sizes to meet their requirement for performance, reliability, and storage.

Memory cells in different types of memory devices (e.g., MLC, TLC or QLC) may store different numbers of bits, thus for the code words of a same size, the number of memory cells included will also be different.

For example, in a implementation, the code word size is 4 KB, and taking the memory cell in the array of memory cells being MLC as an example, each memory cell stores 2 bits, thus the number of memory cells included in the code word is $2^{11}$.

For example, in another implementation, the code word size is 4 KB, and taking the memory cell in the array of memory cells being QLC as an example, each memory cell stores 4 bits, thus the number of memory cells included in the code word is $2^{10}$.

It should be noted that in actual code words, there will be some additional reserved space for management and error correction, thus the actual number of memory cells required may slightly exceed the calculation results described above.

It may be understood that a code word may include a plurality of memory cells, and the number of memory cells included in a code word may be adjusted according to actual situations.

It should be noted that in some examples, during the process of reading the memory device, one read operation reads data of one physical page, and when the number of memory cells included in the code word may be less than the number of memory cells coupled to one physical page, the code word is a unit that may be performed to obtain the first result, but the case of multiple code words is not excluded. That is, the first result corresponding to at least the code word at the target read voltage may be obtained here. For example, a page may include 4 code words, the page buffer hardware operation may count the Fail Bit Count (FBC) of each of the 4 code words at one time, and then the FBC of the four code words are added to obtain the FBC of one physical page, and the added value is used by subsequent calculations. It may be understood that the first result here is based on one physical page of data, which may include multiple code words.

In some examples, before obtaining the first result corresponding to the target location at the initial target read voltage, the read mode of the memory device is set to a single level read (SLR) mode; the single level read mode includes reading at least one bit of the stored state stored in the memory cell through a first-level read voltage.

In some examples, the memory cell includes M bits, the memory device includes M-type pages, and the memory cell with M bits reads its M bits of storage data with read voltages at N levels; the M and N are both integers greater than 1, and $N=2^M-1$.

The method may include, for read voltages at each level of the read voltages at multiple levels corresponding to each type of page, determining the valley voltage at each level in accordance with the plurality of first results corresponding to the multiple read voltages at each level.

Figure 8:
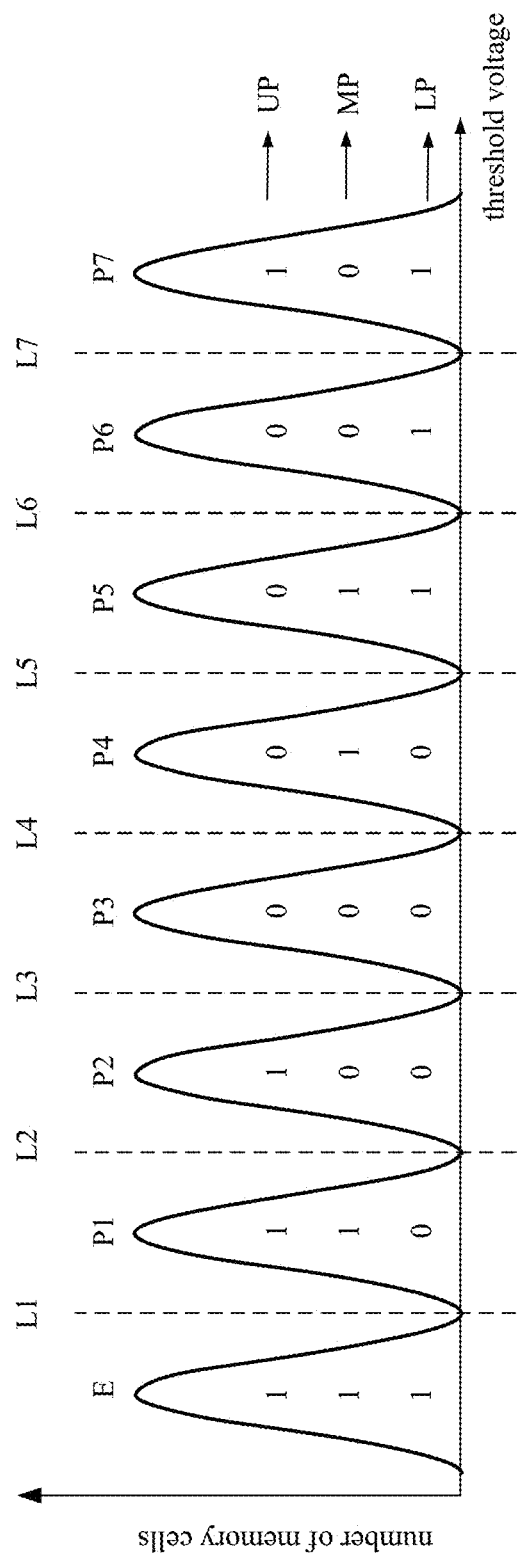
FIG. 8 is a schematic diagram of the threshold voltage distribution corresponding to a memory cell including 3 memory bits provided by an example of the present application.

In one example, when the number of bits stored in the memory cell include three bits, the corresponding storage states include the 0-th state to the 7-th state, referring to FIG. 8, the 8 states are the 0-th (also referred to as erase state) state E, the first state (also referred to as the first storage state) P1, the second state (also referred to as the second storage state) P2 . . . the 7-th state (also referred to as the 7-th storage state) P7, and the binary data corresponding to the 8 states are 111, 110, 100, 000, 010, 011, 001, 101, respectively. Accordingly, the memory device includes three types of pages, namely lower page (LP), middle page (MP), and upper page (UP).

Taking the memory cell shown in FIG. 8 as an example, the three bits and the eight states of storage data may be read by the three-bit memory cell with read voltages at 7 levels (the first-level read voltage L1, the second-level read voltage L2, and the third-level read voltage L3, the fourth-level read voltage L4, the fifth-level read voltage L5, the sixth-level read voltage L6 and the seventh-level read voltage L7 as shown in FIG. 8).

In some examples, the method for operating the memory device further includes, for read voltages at each level of the read voltages at multiple levels corresponding to each type of page, determining the valley voltage at each level in accordance with the plurality of first results corresponding to the multiple read voltages at each level.

In one example, each type of page corresponds to read voltages at multiple levels. As shown in FIG. 8, the lower page corresponds to a first-level read voltage L1 and a fifth-level read voltage L5. The middle page corresponds to the second-level read voltage L2, the fourth-level read voltage L4, and the sixth-level read voltage L6. The upper page corresponds to the third-level read voltage L3 and the seventh-level read voltage L7. For the first-level read voltage L1 and the fifth-level read voltage L5 corresponding to the lower page, the valley voltage in the first-level read voltage L1 may be determined in accordance with a plurality of first results corresponding to the multiple read voltages in the first-level read voltage L1. Then, the valley voltage in the fifth-level read voltage L5 may be determined in accordance with the plurality of first results corresponding to the multiple read voltages in the fifth-level read voltage L5, thus, the valley voltage in read voltages at each level of read voltages at multiple levels corresponding to the lower page may be obtained. The process of determining the valley voltage in the read voltages at each level of the read voltages at multiple levels corresponding to the middle page and the upper page is similar to that of the lower page, and will not be repeated here.

The lower page is usually closest to the source/drain, thus the valley voltage in read voltages at each level of read voltages at multiple levels corresponding to the lower page is determined in a higher priority, which results in the fastest access speed and the shortest response time, and ensures balanced performance and durability during data access.

It should be noted that the method for determining the valley voltage in the read voltages at each level of the read voltages at multiple levels corresponding to the lower page in a higher priority is only an example and is not used to limit the order for determining the valley voltage in the read voltages at each level of the read voltages at multiple levels corresponding to each type of page in the example of the present application.

Figure 9:
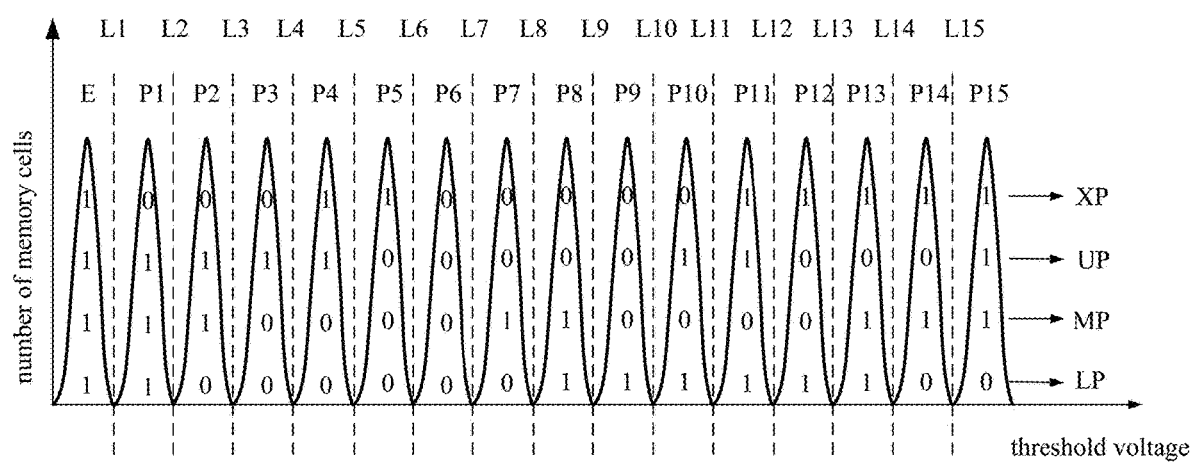
FIG. 9 is a schematic diagram of the threshold voltage distribution corresponding to a memory cell including 4 memory bits provided by an example of the present application.

In one example, when the stored bits in the memory cell include four bits, the corresponding storage states include the 0-th state to the 15-th state, referring to FIG. 9, the 16 states are the 0-th (also referred to as erase state) state E, the first state (also referred to as the first storage state) P1, the second state (also referred to as the second storage state) P2 . . . the 15-th state (also referred to as the 15-th storage state) P15, and the binary data corresponding to the 16 states are 1111, 0111, 0110 . . . 1110 respectively. Accordingly, the memory device includes four types of pages, namely lower page, middle page, upper page, and extra page (XP). Here, the four stored bits corresponding to the 16 states are stored in the lower page, middle page, upper page, and extra page respectively.

Taking the memory cell shown in FIG. 9 as an example, the four bits and the sixteen states of storage data may be read by the four-bit memory cell with read voltages at 15 levels (the first-level read voltage L1, the second-level read voltage L2, and the third-level read voltage L3, the fourth-level read voltage L4, the fifth-level read voltage L5, the sixth-level read voltage L6, the seventh-level read voltage L7, the eighth-level read voltage L8, the ninth-level read voltage L9, the tenth-level read voltage L10, the eleventh-level read voltage L11, the twelfth-level read voltage L12, the thirteenth-level read voltage L13, the fourteenth-level read voltage L14, the fifteenth-level read voltage L15 as shown in FIG. 9).

In one example, each type of page corresponds to read voltages at multiple levels. As shown in FIG. 9, the lower page corresponds to the second-level read voltage L2, the eighth-level read voltage L8, and the fourteenth-level read voltage L14. The middle page corresponds to the third-level read voltage L3, the seventh-level read voltage L7, the ninth-level read voltage L9, and the thirteenth-level read voltage L13. The upper page corresponds to the fifth-level read voltage L5, the tenth-level read voltage L10, the twelfth-level read voltage L12, and the fifteenth-level read voltage L15. The extra page corresponds to the first-level read voltage L1, the fourth-level read voltage L4, the sixth-level read voltage L6, and the eleventh-level read voltage L11.

For the second-level read voltage L2, the eighth-level read voltage L8, and the fourteenth-level read voltage L14 corresponding to the lower page, the valley voltage in the second-level read voltage L2 may be determined in accordance with a plurality of first results corresponding to the multiple read voltages in the second-level read voltage L2. Then the valley voltage in the eighth-level read voltage L8 may be determined in accordance with a plurality of first results corresponding to the multiple read voltages in the eighth-level read voltage L8. Finally, the valley voltage in the fourteenth-level read voltage L14 may be determined in accordance with the plurality of first results corresponding to the multiple read voltages in the fourteenth-level read voltage L14; thus, the valley voltage in the read voltages at each level of the read voltages at multiple levels corresponding to the lower page may be obtained. The process of determining the valley voltage in the read voltages at each level of the read voltages at multiple levels corresponding to the middle page and the upper page is similar to that of the lower page, and will not be repeated here.

Figure 10:
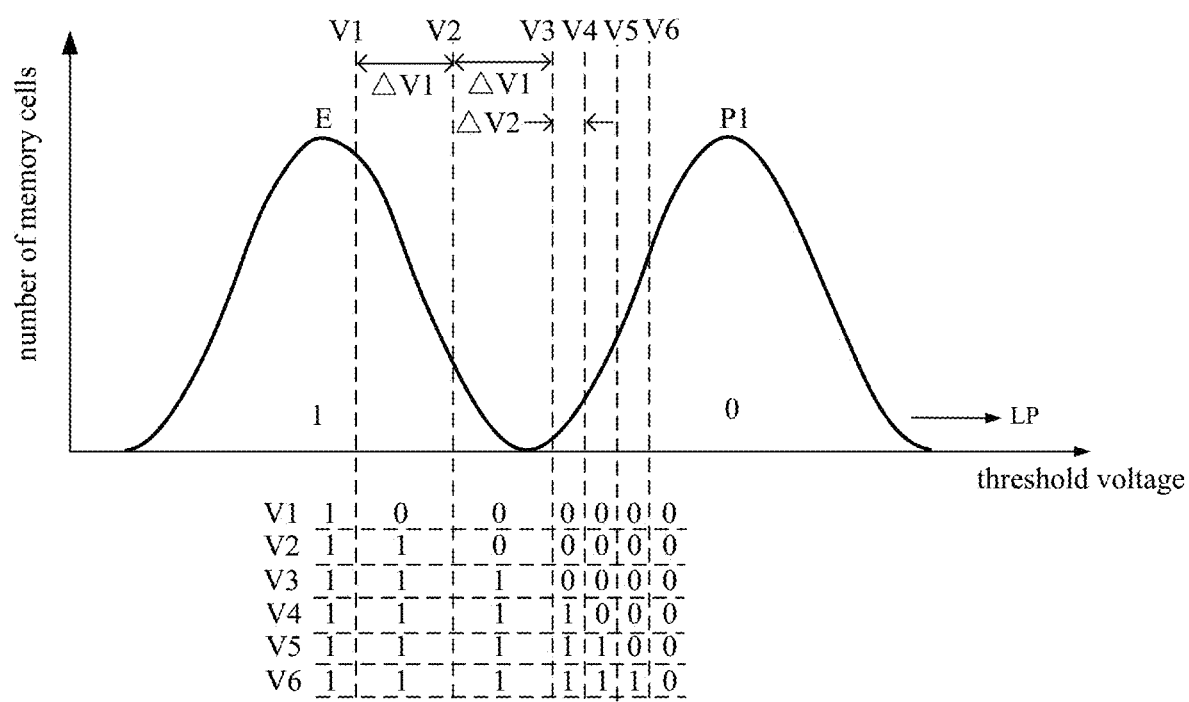
FIG. 10 is a schematic diagram of a method for confirming the valley voltage in the first-level read voltage L1 corresponding to the lower page shown in FIG. 8 provided by an example of the present application.
Figure 11:
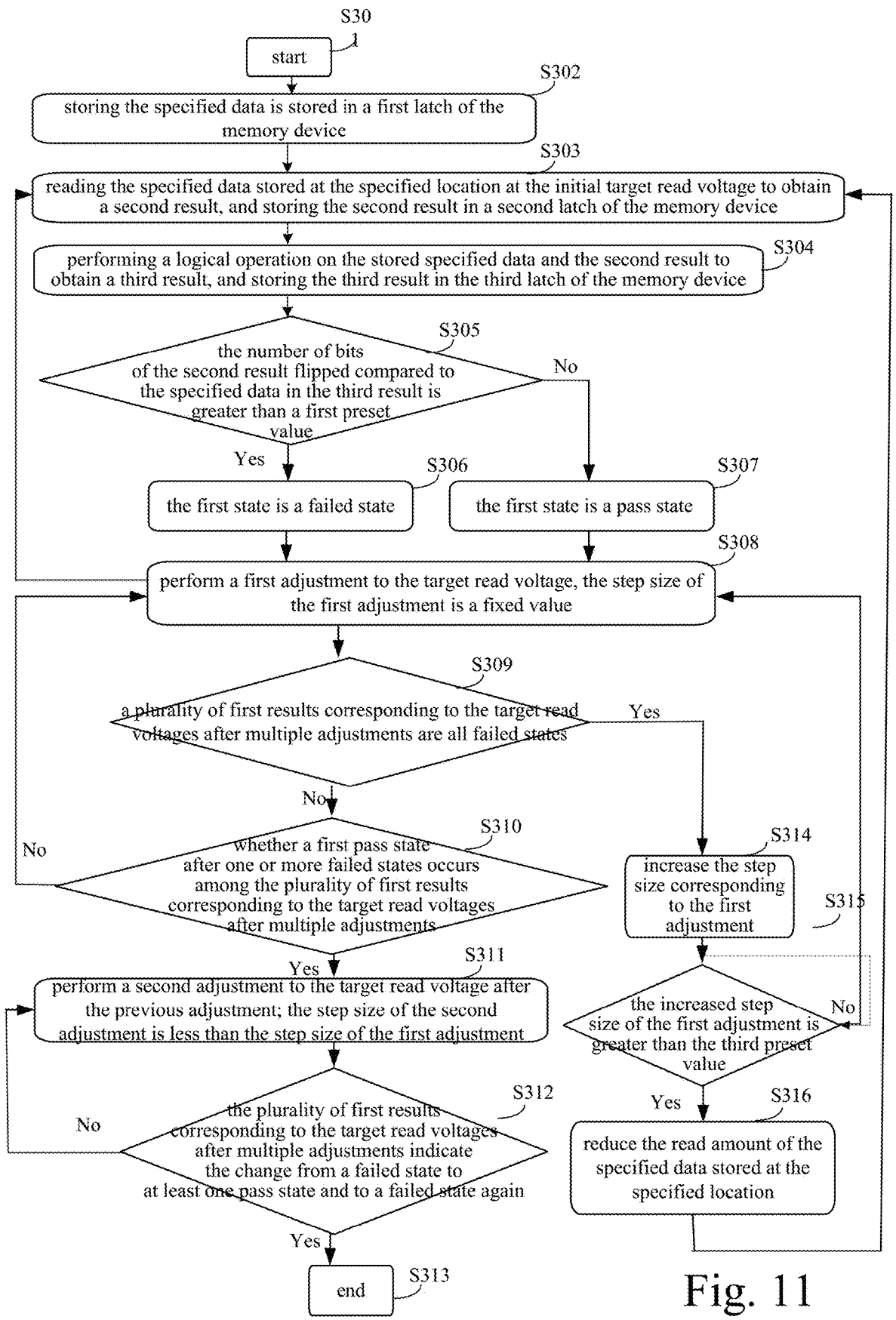
FIG. 11 is a flowchart of a method for operating a memory device provided by an example of the present application.

FIG. 10 is a schematic diagram of a method for confirming the valley voltage in the first-level read voltage L1 corresponding to the lower page shown in FIG. 8 provided by an example of the present application. FIG. 11 is a flowchart of a method for operating a memory device provided by an example of the present application. The process of determining a valley voltage may be described in detail below combined with FIGS. 8, 10, and 11.

At operation S301, the first preset value and the third preset value are obtained; the first preset value may be obtained in accordance with historical data; in some examples, the first preset value is less than or equal to the upper limit of the fail bit count (FBC) supported by the memory device.

At operation S302, the specified data is stored in a first latch of the memory device.

Before operation S302, in the process of performing a write operation on the array of memory cells, the specified data is written at a target location in the array of memory cells.

The target location may include at least one of each of the memory blocks, each of the memory rows, and each of the code words.

Here, the specified data as functional data which is to verify the magnitude of the difference between the read data and the actual stored data, is to determine the valley voltage and to verify the reliability and data integrity of the memory cell. The specified data may be generated by the memory device according to a specified algorithm or provided by the memory controller. In short, the correct data of the specified data (the specified data initially stored with the user data) is known by the memory device. In order to facilitate subsequent comparison and verification operations, at operation S302, the specified data is stored in the first latch of the memory device to detect whether read errors or data corruption occur between the data reading at the target read voltage relative to the specified data which is actually stored.

It should be noted that in the example of the present application, the threshold voltage change of the memory cell in which the user data is stored with the specified data may be indicated by the threshold voltage change of the memory cell at which the specified data is located; it may be understood that the manufacturing processes of these memory cells and environments experienced by these memory cells are the same; therefore, the threshold voltage change of the memory cell at which the specified data is located may be used to indicate the threshold voltage change of the memory cell in which the user data is stored with the specified data.

The target location here actually limits the jurisdiction of the specified data. When the target location includes each of the memory blocks, it means that specified data may be stored in each of the memory blocks, and the threshold voltage change of the memory cell at which the specified data is located is used to indicate the threshold voltage change of the corresponding memory cell of the memory block; and when the target location includes each memory row, it means that each of the specified data may be stored in each of the memory rows, and the threshold voltage change of the memory cell at which the specified data is located is to indicate the threshold voltage change of the memory cell in the corresponding memory row. It may be understood that the greater the storage capacity corresponding to the target location is, the greater the number of memory cells indicated by the threshold voltage change of the memory cell at which the specified data is located is, a large number of memory cells may share the threshold change of the memory cells at a target location, and the shorter the time to find the valley voltage is; the less the storage capacity corresponding to the target location is, the less the number of memory cells indicated by the threshold voltage change of the memory cell at which the specified data is located is, accordingly, the obtained valley voltage is more accurate.

For example, the specified data is 110110110 . . . 110, and it may be understood that after the write operation is performed on the array of memory cells, the data stored in each of the memory cells in the code word is "110"; that is, after the write operation, each of the memory cells in the code word is in the first state P1 shown in FIG. 8.

In some examples, the first latch includes M sub-latches, and the M sub-latches are respectively used to store data of M types of pages.

In some examples, taking the memory cell shown in FIG. 8 as an example, the first latch includes three sub-latches (Latch1-1, Latch1-2, Latch1-3), and the specified data 110110110 . . . 110 is stored in the three sub-latches of the first latch. Among them, Latch1-1 is used to store data for the upper page, Latch1-2 is used to store data for the middle page, and Latch1-3 is used to store data for the lower page, that is, Latch1-1 is used to store 111 . . . 1, Latch1-2 is used to store 111 . . . 1, and Latch1-3 is used to store 000 . . . 0.

At operation S303, the specified data stored at the target location is read at the initial target read voltage to obtain a second result, and the second result is stored in a second latch of the memory device.

It should be noted that the data stored in the first latch is the correct data of the specified data, and the data in the second latch is the read data after the specified data is stored for a period of time.

In some examples, taking the initial target read voltage V1 as an example for illustration, as shown in FIG. 10, the specified data stored in the code word is read at the initial target read voltage V1 to obtain the second result. In some examples, the data stored in the lower page of the memory cell in the code word is read at the initial target read voltage V1, the memory cell with the threshold voltage being less than the initial target read voltage V1 is labeled as bit 1, and the memory cell with the threshold voltage being greater than the initial target read voltage V1 is labeled as bit 0; a second result is obtained and stored in the second latch of the memory device.

It should be noted that the initial target read voltage V1 used for the first time here may refer to the preset read voltage that may distinguish two adjacent storage states of the memory cell of the memory device in the previous read process. The preset read voltage may be an empirical value, or it may be a default value configured when the memory device leaves the factory, the default value is obtained through extensive simulation experiments before the memory device leaves the factory.

At operation S304, performing a logical operation on the stored specified data and the second result to obtain a third result, and storing the third result in the third latch of the memory device.

In some examples, an XOR operation is performed on the data stored in the sub-latches Latch1-3 of the first latch and the second result to obtain a third result; the third result is stored in the third latch of the memory device.

It should be noted that the XOR operation is one of the basic logical operations; in binary, if two binary numbers at the same position are the same, the result is "0"; and if two binary numbers at the same position are different, the result is "1" (e.g., same is 0, and different is 1).

The part in which the bit is 1 in the third result represents the number of bits which are flipped in the second result relative to the specified data, e.g., when being read at the initial target read voltage V1, the number of bits which are flipped in the specified data stored in the memory cell of the code word relative to the specified data written in the memory cell of the code word.

It should be noted that the specified data stored in the first latch may be understood as the data which is actually stored at the target location, the third result is used to determine information which represents the number of bits which are flipped in the read data obtained by performing a read operation on the target location at the certain read voltage relative to specified data which is actually stored. In other words, the third result represents the difference between the read data and the actual stored data.

In some examples, each code word includes 23 TLC memory cells, and the specified data written into the code word is 11011011011011011011011011011011011011011011011 0110; that is, the specified data stored in the first latch is 11011011011011011011011011011011011011011011011 0110, and the data stored in the sub-latch Latch1-1 of the first latch is 11111111; the data stored in the sub-latch Latch1-2 of the first latch is 11111111, and the data stored in the sub-latch Latch1-3 of the first latch is 00000000, data in the lower page of the specified data stored in the memory cell in the code word read at the initial target read voltage V1 is 01010101, then the third result is 01010101, the part in which the bit is 1 in the third result represents the number of bits which are flipped in the read data at the target location relative to the data written into the same target location.

At operation S305, the number of bits in the third result that represent flip of bits in the second result relative to the specified data is compared with a first preset value, and it is determined whether the number of bits in the third result that represent flip of bits in the second result relative to the specified data is greater than a first preset value, and the result of comparing is to be the first result.

In some examples, the first preset value is less than or equal to the upper limit of the fail bit count supported by the memory device. The upper limit of the fail bit count supported by the memory device means that fail bits within the upper limit may be detected and corrected through the built-in error correction mechanism, while fail bits exceeding the upper limit cannot be corrected. The magnitude of the first preset value is related to the type of memory device, storage density, etc. The first preset value may be an empirical value, or it may be a default value configured when the memory device leaves the factory, the default value is obtained through extensive simulation experiments before the memory device leaves the factory. In some examples, the range of the first preset value is set to 70 to 120, and more in some examples, the first preset value may be 70, 80, 90, 100, 110, 120.

When the number of bits in the third result that represent flip of bits in the second result relative to the specified data is greater than the first preset value, operation S306 is performed; and the first state is determined to be a failed state, which means that the difference between the read result obtained through performing the read operation at the read voltage corresponding to the first result and data which is actually stored is too large; thus, the read result may contain uncorrectable errors, and data integrity and reliability are threatened.

When the number of bits in the third result that represent flip of bits in the second result relative to the specified data is less than or equal to the first preset value, operation S307 is performed; and the first state is determined to be a pass state, which means that the difference between the read result obtained through performing the read operation at the read voltage corresponding to the first result and data which is actually stored is small; therefore, error rate of the read result is low and reliability is high.

After operation S306 or operation S307 is performed, operation S308 is continued to be performed. At operation S308, a first adjustment is performed to the target read voltage; the step size of the first adjustment may be a fixed value.

In some examples, Table 1 is an example of a plurality of first results obtained through multiple iterations.

TABLE 1

| iteration order | first result |
| --- | --- |
| 1 | failed |
| 2 | failed |
| 3 | pass |
| 4 | pass |
| 5 | pass |
| 6 | failed |

Here, the first adjustment may be understood as a large amplitude adjustment; and in some examples, the large amplitude here, e.g., the range of the step size of the first adjustment is set to 50 mV to 80 mV, e.g., the step size of the first adjustment may be 50 mV, 60 mV, 70 mV, 80 mV.

Combining Table 1 and FIG. 10, the first result corresponding to the initial target read voltage V1 obtained through the first iteration is a failed state. Operation S308 is performed, taking the initial target read voltage V1 as an example, the first adjustment is performed to the initial target read voltage V1 to obtain the target adjustment voltage (V2 shown in FIG. 10), which is denoted as the target read voltage V2 after the first adjustment, there is a first voltage difference ΔV1 between the initial target read voltage V1 and the target read voltage V2 after the first adjustment, and the magnitude of the first voltage difference is the step size of the first adjustment.

After operation S308 is performed, the operations may return to operation S303. It should be noted that the target read voltage here is the target read voltage V2 after the first adjustment.

Returning to operation S303, the first data stored at the target location is read at the target read voltage V2 after the first adjustment to obtain a second result, and the second result is stored in a second latch of the memory device.

At operation S304 a logical operation is performed on the stored specified data and the second result to obtain a third result, and the third result is stored in the third latch of the memory device.

At operation S305 the number of bits in the third result that represent flip of bits in the second result relative to the specified data is compared with a first preset value, and it is determined whether the number of bits in the third result that represent flip of bits in the second result relative to the specified data is greater than a first preset value.

When the number of bits in the third result which represents the number of bits in the second result which are flipped relative to the specified data is greater than the first preset value, operation S306 is performed. At operation S306, it is determined that the first result corresponding to the target location at the target read voltage V2 after the first adjustment is a failed state.

When the number of bits in the third result, which represents the number of bits in the second result which are flipped relative to the specified data is less than or equal to the first preset value, operation S307 is performed. At operation S307, it is determined that the first result corresponding to the target location at the target read voltage V2 after the first adjustment is a pass state.

As shown in Table 1 and FIG. 10, the first adjustment is performed to the initial target read voltage V1 to obtain the target adjustment voltage (V2 shown in FIG. 10, e.g., the target read voltage V2 after the first adjustment), the first result corresponding to the target read voltage V2 after the first adjustment obtained through the second iteration is a failed state.

It may be understood that the direction of the first adjustment to the initial target read voltage V1 for the first time may be random, it is only required to ensure that the absolute value of the voltage difference between the target read voltage V2 after the first adjustment obtained through performing the first adjustment to the initial target read voltage V1 and the initial target read voltage V1 is equal to the step size of the first adjustment. The target read voltage V2 after the first adjustment may be greater than or less than the initial target read voltage V1.

It is to be understood that it is required to perform operation 303 to operation S308 in loop to perform multiple adjustments to the initial target read voltage, and respectively obtain a first result corresponding to the target location at target read voltage after each of the adjustments. It should be noted that in practice, the number of times of performing operation 303 to operation S308 in loop may be changed according to actual needs, and the scope of the present application should not be unduly limited here.

In some examples, operation S309 is performed after operation 303 to operation S308 is performed in a loop three times.

In some implementations, after the first result corresponding to the target location at the target read voltage V2 after the first adjustment is obtained, the operation S308 is performed again. As shown in FIG. 10, a first adjustment is performed to the target read voltage V2 after the first adjustment to obtain a target read voltage V3 after a second adjustment, there is a voltage difference ΔV1 between the target read voltage V2 after the first adjustment and the target read voltage V3 after the second adjustment.

After operation S308 is performed, the operations may return to operation S303; it should be noted that the target read voltage here is the target read voltage V3 after the second adjustment. Operation S303 to operation S307 are performed, the first result corresponding to the target read voltage V3 after the second adjustment obtained through the third iteration is a pass state.

Thus, three first results corresponding to three different read voltages are obtained. In some implementations, as shown in Table 1 and FIG. 10, the first result corresponding to the target location at the initial target read voltage V1 during the first iteration is a failed state. The first result corresponding to the target location at the target read voltage V2 after the first adjustment during the second iteration is a failed state. The first result corresponding to the target location at the target read voltage V3 after the second adjustment during the third iteration is a failed state.

After the preset number of first results are obtained, operation S309 is continued to be performed. At operation S309, it is determined whether a plurality of first results corresponding to the target read voltages after multiple adjustments are all failed states.

If one or more pass states occur among the plurality of first results corresponding to the target read voltages after multiple adjustments, operation S310 is performed. In some examples, the changing trends of the three first results corresponding to three different read voltages shown in Table 1 are failed state, failed state, and pass state in sequence. Thus, one pass state occurs among the plurality of first results described above, then operation S310 is continued to be performed.

At operation S310, it is determined whether a first pass state after one or more failed states occurs among the plurality of first results corresponding to the target read voltages after multiple adjustments.

If a first pass state after one or more failed states occurs among the plurality of first results corresponding to the target read voltages after multiple adjustments, operation S310 is performed. In some examples, the three first results corresponding to three different read voltages are respectively failed state, failed state, and pass state shown in FIG. 10, e.g., a first pass state after multiple failed states occurs among the plurality of first results as described above.

If no first pass state after multiple failed states occurs among the plurality of first results corresponding to target read voltages after multiple adjustments, the operations may return to operation S311. In some examples, the three first results corresponding to three different read voltages are pass state, failed state, and failed state, respectively, and the operations may return to operation S308. At operation S308, a first adjustment is performed to the read voltage after the previous adjustment and a first state at the adjusted voltage is obtained, the first result corresponding to the adjusted read voltage may be obtained through performing operations S303 to S307.

At operation S311, after a first pass state after one or more failed states occurs among the plurality of first results corresponding to the target read voltages after multiple adjustments, a second adjustment is performed to the target read voltage after the previous adjustment; the step size of the second adjustment is less than the step size of the first adjustment.

In some examples, as shown in Table 1 and FIG. 10, a second adjustment is performed to the target read voltage V2 after the second adjustment to obtain the target read voltage V4 after the third adjustment. The first result may correspond to the target read voltage V4 after the third adjustment obtained through the fourth iteration is a pass state. There is a second voltage difference ΔV2 between the target read voltage V3 after the second adjustment and the target read voltage V4 after the third adjustment, and the magnitude of the second voltage difference ΔV2 is the step size of the second adjustment. The step size of the second adjustment is less than the step size of the first adjustment, e.g., the second voltage difference ΔV2 is less than the first voltage difference ΔV1. The amplitude of the step size of the second adjustment is relatively small, and the second adjustment may be understood as a small amplitude adjustment.

In some examples, the range of the step size of the second adjustment is set to 10 mV to 40 mV, and in some examples, the step size of the second adjustment may be 10 mV, 15 mV, 25 mV, 35 mV, 40 mV.

It should be noted that after operation S311 is performed, the first result corresponding to the target read voltage V4 after the third adjustment is obtained through the fourth iteration by performing operation S303 to operation S307.

In other examples, after a first pass state after one or more failed states occurs among the plurality of first results corresponding to the target read voltages after multiple adjustments, a third adjustment to the read voltage after a previous adjustment is performed in accordance with the result of counting in the third result corresponding to the first pass state. The step size of the third adjustment may vary according to the number of bits in the third result which represents the number of bits in the second result which are flipped relative to the specified data.

As shown in Table 1 and FIG. 10, the first result corresponding to the target read voltage V4 after the third adjustment obtained through the fourth iteration is a first pass state after one or more failed states occurs among the plurality of first results corresponding to the target read voltages after multiple adjustments, and a third adjustment is performed to the target read voltage V4 after the third adjustment in accordance with the number of counting for the third result corresponding to the target read voltage V4 after the third adjustment.

In some examples, the number of bits in the third result corresponding to the target read voltage V4 after the third adjustment that represent flip of bits in the second result relative to the specified data is counted, if the result of counting is less than 0.5 times the first preset value, it may be considered that the number of flipped bits is small, which means that the error rate of the read result obtained through performing the read operation with the target read voltage V4 after the third adjustment is very low. In this case, the step size of the third adjustment may be adjusted to be greater than the step size of the first adjustment, possible states may be faster explored through increased step size, thereby efficiency is improved.

If the result of counting is greater than or equal to 0.5 times the first preset value, it may be considered that although the number of flipped bits is within the upper limit of the fail bit count supported by the memory device, the number of flipped bits is large, which means that the error rate of the read result obtained through performing the read operation with the target read voltage V4 after the third adjustment is high.

In this case, the step size of the third adjustment may be adjusted to be less than the step size of the second adjustment, by reducing the step size, more first results may be obtained as pass states at the read voltages which are close to the target read voltage V4 after the third adjustment at which the first pass state is obtained, thereby increasing the basis for determining the valley voltage.

The method described above flexibly and dynamically adjusts the step size of the third adjustment by counting the number of the bits in the third result corresponding to the first pass state, which can improve system performance and accuracy.

Operation S312 is performed after operation S311, if the plurality of first results corresponding to the target read voltages after multiple adjustments indicate the change from a failed state to at least one pass state and to a failed state again, operation S313 is performed where adjustment of the read voltage is stopped, and the operation ends.

If the plurality of first results corresponding to the target read voltages after multiple adjustments do not indicate the change from a failed state to at least one pass state and to a failed state again, the operations may return to operation S311. At operation S311, a second adjustment is performed to the target read voltage V4 after the third adjustment to obtain the target read voltage V5 after the fourth adjustment, the first result corresponding to the target read voltage V5 after the fourth adjustment obtained through the fifth iteration is a pass state.

Operation S312 may be performed again. Here, the plurality of first results corresponding to the target read voltages after multiple adjustments do not indicate the change from a failed state to at least one pass state and to a failed state again, return to operation S311 where a second adjustment is performed to the target read voltage V5 after the fourth adjustment to obtain the target read voltage V6 after the fifth adjustment. The first result may correspond to the target read voltage V6 after the fifth adjustment obtained through the sixth iteration is a failed state.

It should be noted that after operation S311 is performed, the first result corresponding to the target location at the read voltage after each of the adjustments is obtained through executing the method from operations S303 to S307. Here, when the plurality of first results corresponding to the target read voltages after multiple adjustments indicate the change from a failed state to at least one pass state and to a failed state again, operation S313 is performed where adjustment of the read voltage is stopped, and the operation ends.

In some examples, when the number of the pass states between the failed states at both ends indicated by the plurality of first results corresponding to the adjusted read voltage include more than one, taking the adjusted read voltage corresponding to one pass state at a middle position among the more than one pass states to be the valley voltage.

In some examples, as shown in Table 1 and FIG. 10, the first result at the initial target read voltage V1 obtained through the first iteration is a failed state. The first result at the target read voltage V2 after the first adjustment obtained through the second iteration is a failed state. The first result at the target read voltage V3 after the second adjustment obtained through the third iteration is a pass state. The first result at the target read voltage V4 after the third adjustment obtained through the fourth iteration is a pass state. The first result at the target read voltage V4 after the fourth adjustment obtained through the fifth iteration is a pass state. The first result at the target read voltage V4 after the fifth adjustment obtained through the sixth iteration is a failed state.

Table 1 shows that the number of pass states between the failed states at both ends indicated by the plurality of first results corresponding to the adjusted read voltage include three. Taking the adjusted read voltage corresponding to one pass state at a middle position among the three pass states to be the valley voltage, e.g., the read voltage corresponding to the first result obtained in the fourth iteration is the valley voltage.

It may be understood that the read voltage corresponding to the first result obtained in the fourth iteration is the valley voltage in the first-level read voltage L1 corresponding to the lower page shown in FIG. 8.

It should be noted that in practice, the number of iterations (e.g., the number of second adjustments performed to the read voltage) may be changed according to actual needs, the implementation of obtaining 6 first results for determining the valley voltage by 6 iterations here is only an example, and the scope of the present disclosure should not be unduly limited.

In some examples, when the number of the pass states between the failed states at both ends indicated by the plurality of first results corresponding to the adjusted read voltage include an even number, taking the adjusted read voltage corresponding to one pass state at a middle position among the more than one pass states to be the valley voltage.

In some implementations, Table 2 is an example of a plurality of first results obtained through multiple iterations. Among the plurality of first results shown in Table 2, the average of the read voltages corresponding to the first results obtained through the fourth and fifth iterations is to be the valley voltage.

TABLE 2

| iteration order | first result |
|---|---|
| 1 | fail |
| 2 | fail |
| 3 | pass |
| 4 | pass |
| 5 | pass |
| 6 | pass |
| 7 | fail |

In some examples, when the number of the pass states between the failed states at both ends indicated by the plurality of first results corresponding to the adjusted read voltage include one, the adjusted read voltage corresponding to the one pass state is to be the valley voltage.

In some examples, Table 3 is an example of a plurality of first results obtained through multiple iterations. Among the plurality of first results shown in Table 3, the read voltages corresponding to the first result obtained in the third iteration is to be the valley voltage.

TABLE 3

| iteration order | first result |
|---|---|
| 1 | fail |
| 2 | fail |
| 3 | pass |
| 4 | fail |

If the determination result of operation S309 in FIG. 11 is "Yes" (e.g., the plurality of first results corresponding to the target read voltages after multiple adjustments are all failed states, which indicates that no pass state occurs among the plurality of first results), then operation S314 is performed, where the step size corresponding to the first adjustment is increased.

The fact that no pass state occurs among the plurality of first results corresponding to the read voltage after multiple adjustments indicates that the current step size corresponding to the first adjustment is too small. This results in a small amplitude of adjustment to the voltage. Therefore, through increasing the step size corresponding to the first adjustment, the amplitude of adjustment to the voltage is increased, and a first pass state may be found more quickly.

Operation S315 is performed after operation S314. At operation S315, the increased step size of the first adjustment is compared with the third preset value to determine whether the increased step size of the first adjustment is greater than the third preset value.

In some examples, the third preset value is used as a limit value or restriction condition for controlling the step size of the first adjustment to balance speed and accuracy. The magnitude of the third preset value is related to the type of memory device, storage density, etc. The third preset value may be an empirical value, or it may be default values configured when the memory device leaves the factory, the default value is obtained through extensive simulation experiments before the memory device leaves the factory. In some examples, the range of the third preset value is set to 80 mV to 100 mV.

When the increased step size of the first adjustment is less than or equal to the third preset value, it means that when the voltage is adjusted with the step size, the first pass state is found more quickly while the accuracy is not reduced. At this time, operation S308 is re-performed with the increased step size of the first adjustment.

When the increased step size of the first adjustment is greater than the third preset value, it means that when the voltage is adjusted with this step size, although the first pass state is found more quickly; however, some states may be missed due to the large adjustment amplitude, and the accuracy of using the state obtained through read result as a basis for determining the valley voltage may be reduced. Here, operation S316 is performed where the read amount of the specified data stored at the target location is reduced, and then operation S303 is re-performed.

It may be understood that when the increased step size of the first adjustment is greater than the third preset value, a balance between speed and accuracy may be achieved through reducing read amount of the specified data stored at the target location.

In some examples, the amount of data stored in the specified data stored in the first latch remains unchanged, and the read amount of the specified data stored at the target location is reduced. The specified data is functional data that verifies the magnitude of the difference between the read data and the actual stored data, and is representative. Thus, even if the read amount of the specified data stored at the target location is reduced, the necessary information will not be lost, and the threshold voltage change of the memory cell where the user data stored together with the specified data can still be indicated by the threshold voltage change of the memory cell where part of the specified data is located.

When obtaining the first result corresponding to the target location at the corresponding voltage, the total amount of data contained in the second result may be reduced, and the total amount of data contained in the third result obtained through a logical operation on the corresponding part of the specified data stored in the first latch and the second result is also reduced. The reduction of the total amount may reduce the number counted from the total amount to a certain extent, e.g., the number of bits in the third result that represent flip of bits in the second result relative to the specified data is also reduced. Thus, the number of bits in the third result that represent flip of bits in the second result relative to the specified data is more likely to be within the range of the first preset value. Thus, it is easier to find a first pass state after one or more failed state occurs among the plurality of first results corresponding to the target read voltage after multiple adjustments.

It should be noted that the process of determining the valley voltage in other levels of read voltage corresponding to the lower page and the process of determining the valley voltage in the multi-level read voltages corresponding to the middle page and upper page are similar to the method disclosed in the example described above, and will not be repeated here.

For example, taking the target location including a code word and the memory cell contained in the code word being a TLC memory cell, read voltages at 7 levels is required to read its three-bit and eight-state of storage data; therefore, the method for operating determining the valley voltage disclosed in the above example will be executed seven times to obtain seven valley voltages corresponding to read voltages at 7 levels, respectively.

It should be noted that the target read voltage in the example of the present application is a general concept, the initial target read voltage and all subsequent adjusted read voltages (target read voltage V2 after the first adjustment, target read voltage V3 after the second adjustment, target read voltage V4 after the third adjustment, target read voltage V5 after the fourth adjustment, target read voltage V6 after the fifth adjustment) may be referred to as a target read voltage.

Figure 12:
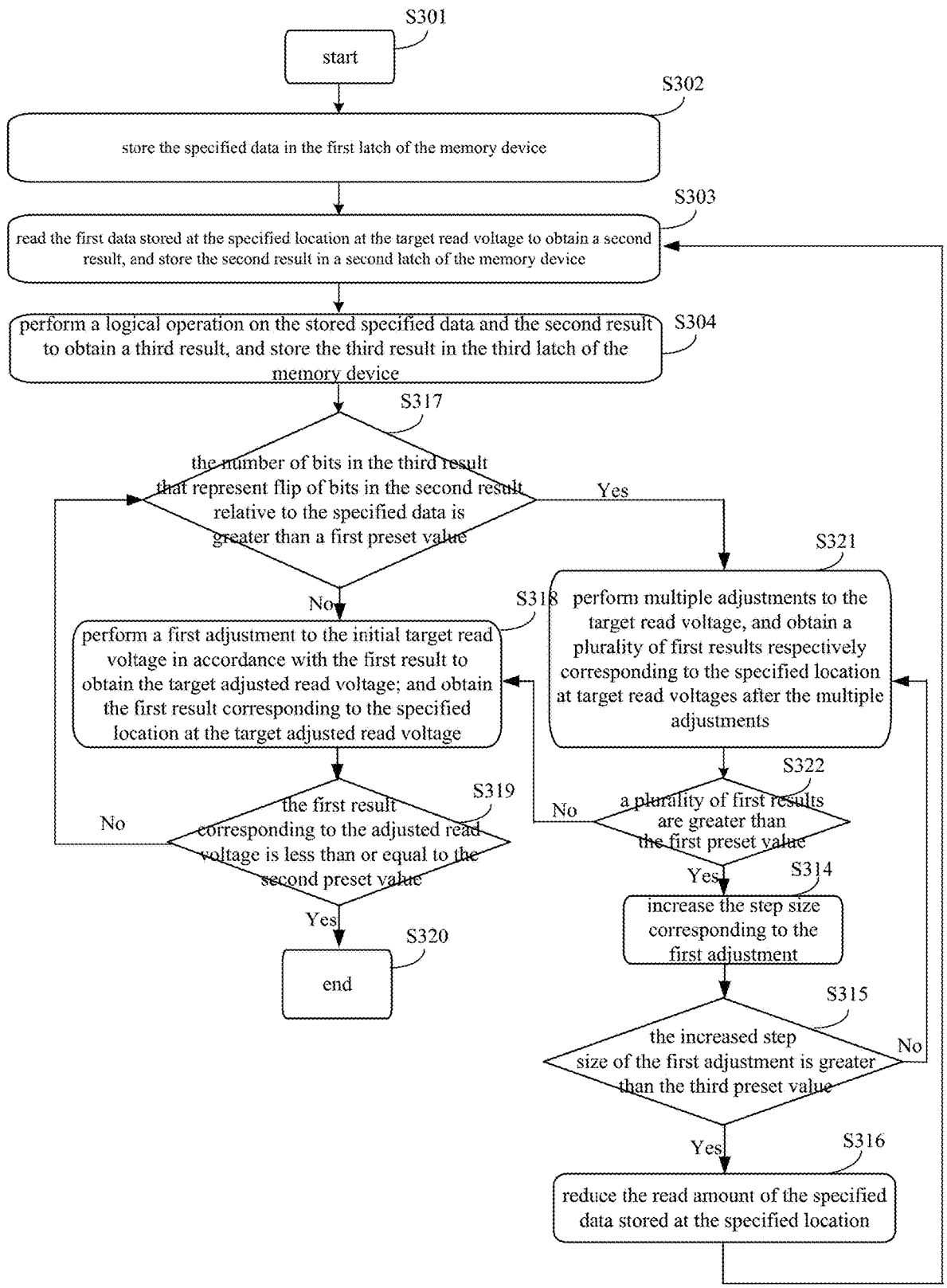
FIG. 12 is a block diagram of a method for operating a memory device provided by another example of the present application.

FIG. 12 is a flowchart of a method for operating a memory device provided by another example of the present application. The process of determining valley voltage will be described in detail below in conjunction with FIGS. 8, 10, and 12.

Here, the operating methods from operation S301 to operation S304 have been described before and will not be repeated here.

It should be noted that operation S301 also includes a process of obtaining a second preset value.

At operation S317, the number of bits in the third result that represent flip of bits in the second result relative to the specified data is counted, and the result of counting is to be the first result. It is determined whether the number of bits in the third result that represent flip of bits in the second result relative to the specified data is greater than a first preset value, e.g., to determine whether the first result is less than or equal to the first preset value.

If the first result is less than or equal to the first preset value, operation S318 is performed.

As shown in FIG. 10, taking the initial target read voltage as an example for illustration, when the first result corresponding to the initial target read voltage is less than or equal to the first preset value, operation S318 is performed. At operation S318, a first adjustment is performed to the initial target read voltage in accordance with the first result to obtain the target adjusted read voltage; and the first result corresponding to the target location at the target adjusted read voltage is obtained.

In some examples, as shown in FIG. 10, the first adjustment is performed to the initial target read voltage V1 in accordance with the first result to obtain the target adjustment voltage (V2 shown in FIG. 10). The target adjustment voltage is denoted as the target read voltage V2 after the first adjustment. There is a first voltage difference ΔV1 between the initial target read voltage V1 and the target read voltage V2 after the first adjustment. The magnitude of the first voltage difference is the step size of the first adjustment. The magnitude of the step size of the first adjustment is determined in accordance with the first result.

In some examples, if the first result corresponding to the initial target read voltage V1 is less than 0.5 times the first preset value, it may be considered that the number of flipped bits is small, which means that the error rate of the read result obtained through performing the read operation with the initial target read voltage V1 is very low. In this case, the first adjustment may be set as a large amplitude adjustment; that is, the step size of the first adjustment is relatively large, so as to explore possible first results more quickly, thereby efficiency is improved.

If the first result corresponding to the initial target read voltage V1 is greater than or equal to 0.5 times the first preset value, it may be considered that the number of flipped bits is within the upper limit of the fail bit count supported by the memory device. However, the number of flipped bits is large, which means that the error rate of the read result obtained through performing the read operation with the initial target read voltage V1 is high. In this case, the first adjustment may be set to a small amplitude adjustment, e.g., the step size of the first adjustment is relatively small, and by reducing the step size, more first results may be obtained as pass states at the read voltages which are close to the target read voltage V4 after the third adjustment at which the first pass state is obtained, thereby increasing the basis for determining the valley voltage.

It may be understood that the direction of the first adjustment of the initial target read voltage V1 for the first time may be random, it is only required to ensure that the absolute value of the voltage difference between the target read voltage V2 after the first adjustment obtained through performing the first adjustment to the initial target read voltage V1 and the initial target read voltage V1 is equal to the step size of the first adjustment. It may be understood that the target read voltage V2 after the first adjustment may be greater than or less than the initial target read voltage V1.

At operation S319, the first result corresponding to the target location at the target adjusted read voltage is compared with the second preset value to determine whether the first result is less than or equal to the second preset value.

In some examples, the second preset value is to be the determination threshold for determining the valley voltage; that is, when the first result is less than or equal to the second preset value, it indicates that the error rate of the read result is low and the reliability of the read result is high when the read voltage corresponding to the first result is the valley voltage.

The magnitude of the second preset value is related to the type of memory device, storage density, etc. The second preset value may be an empirical value, or it may be one or more default values configured when the memory device leaves the factory. The default value is obtained through extensive simulation experiments before the memory device leaves the factory. In some examples, the range of the second preset value is set to 5 to 30, and more in some examples, the second preset value may be 5, 10, 15, 20, 25, 30.

In some examples, when operation S319 is performed after operation S318, if the first result corresponding to the target location at the target adjusted read voltage (e.g., the target read voltage V2 after the first adjustment) is less than or equal to the second preset value, operation S309 is performed and the operation ends. It may be understood that the target read voltage V2 after the first adjustment here may be the valley voltage in the first-level read voltage L1 corresponding to the lower page shown in FIG. 8.

In other examples, when operation S319 is performed after operation S318, if the first result corresponding to the target location at the target adjusted read voltage (e.g., the target read voltage V2 after the first adjustment) is greater than the second preset value, return to operation S317 where the first result greater than the second preset value is compared with the first preset value to determine whether the first result is less than or equal to the first preset value.

If the first result corresponding to the target location at the target adjusted read voltage (e.g., the target read voltage V2 after the first adjustment) is less than or equal to the first preset value and greater than the second preset value, then continue to perform operation S318; here, the target read voltage referred to at operation S318 is the target read voltage V2 after the first adjustment. In accordance with the first result corresponding to the target location at the target read voltage V2 after the first adjustment, the first adjustment is performed to the target read voltage V2 after the first adjustment to obtain the adjusted read voltage and the first result corresponding to the target location at the adjusted read voltage.

In some examples, the step size of the first adjustment to the target read voltage V2 after the first adjustment in accordance with the first result corresponding to the target location at the target read voltage V2 after the first adjustment changes in accordance with the value of the first result. For the method of changing the step size of the first adjustment in accordance with the value of the first result, reference may be made to the relevant description at operation S318, which will not be repeated here.

In some examples, the direction of the second adjustment performed to the target read voltage V2 after the first adjustment in accordance with the first result corresponding to the target location at the target read voltage V2 after the first adjustment is related to the magnitude relationship between the first result corresponding to the initial target read voltage V1 and the first result corresponding to the target adjusted read voltage V2 after the first adjustment.

For example, after a first adjustment is performed to the initial target read voltage V1 for the first time, the target read voltage V2 after the first adjustment is greater than the initial target read voltage V1, and the first result corresponding to the target read voltage V2 after the first adjustment is less than the first result corresponding to the initial target read voltage V1, which means that adjusting the initial target read voltage V1 to the right (the direction of voltage increase) may reduce the number of bits at the target location which are flipped in a result of reading at the target read voltage relative to specified data which is actually stored.

Therefore, when the first adjustment of the target read voltage V2 after the first adjustment is continued, the target read voltage V2 after the first adjustment will preferentially continue to be adjusted to the right to obtain the adjusted read voltage and the first result corresponding to the target location at the adjusted read voltage.

It may be understood that the direction of the first adjustment of a certain target read voltage will be selected in accordance with the change trend of the first results before and after the previous first adjustment, so as to further reduce the number of bits at the target location which are flipped in a result of reading at the target read voltage relative to specified data which is actually stored.

After obtaining the adjusted read voltage and the first result corresponding to the target location at the adjusted read voltage, the operations may proceed to operation S319.

If it is determined that the first result corresponding to the adjusted read voltage is less than or equal to the second preset value, operation S320 is performed and the operation ends.

In some examples, determining the valley voltage in accordance with obtained a plurality of first results includes, when the first result corresponding to the final adjusted read voltage is less than or equal to the second preset value, the read voltage corresponding to the smallest first result among the first results is to be the valley voltage.

In some examples, Table 4 is an example of a plurality of first results obtained through multiple iterations. As shown in Table 4, the first result obtained in the first iteration is 120. The first result obtained in the second iteration is 100. The first result obtained in the third iteration is 70. The first result obtained in the fourth iteration is 5.

In some implementations, the first preset value is set to 120, and the second preset value is set to 10.

In some examples, during the performing the method for operating the memory device shown in FIG. 12, when the first result obtained in the fourth iteration is less than or equal to the second preset value, a preset number of iterations may be continued to additionally obtain a plurality of first results.

Thus, the accuracy of determining the valley voltage in accordance with a plurality of first results can be further enhanced. In some examples, first results obtained from the fifth iteration to the seventh iteration are shown in Table 4. The first result obtained in the fifth iteration is 40. The first result obtained in the sixth iteration is 90. The first result obtained in the seventh iteration is 110.

The read voltage corresponding to the smallest first result among the plurality of first results in Table 4 is to be the valley voltage, e.g., the read voltage corresponding to the first result obtained in the fourth iteration is to be the valley voltage.

It may be understood that the read voltage corresponding to the first result obtained in the fourth iteration is the valley voltage in the first-level read voltage L1 corresponding to the lower page shown in FIG. 8.

TABLE 4

| iteration order | first result |
|---|---|
| 1 | 120 |
| 2 | 100 |
| 3 | 70 |
| 4 | 5 |
| 5 | 40 |
| 6 | 90 |
| 7 | 110 |

If the determination result of operation S317 in FIG. 12 is that the first result is greater than the first preset value, then operation S321 is performed. At operation S321 multiple adjustments are performed to the target read voltage, and a plurality of first results respectively corresponding to the target location at target read voltages after the multiple adjustments are obtained.

After a plurality of first results are obtained, operation S322 is performed.

At operation S322, the plurality of first results are compared with the first preset value to determine whether the plurality of first results are all greater than the first preset value. When a plurality of first results are greater than the first preset value, operation S312 is performed where the step size corresponding to the first adjustment is increased.

Operation S315 is performed after operation S314. At operation S315, the increased step size of the first adjustment is compared with the third preset value to determine whether the increased step size of the first adjustment is greater than the third preset value.

When the increased step size of the first adjustment is less than or equal to the third preset value, it means that when the voltage is adjusted with the step size, and the first result less than the first preset value is found more quickly while the accuracy is not reduced. At this time, operation S3321 is re-performed with the increased step size of the first adjustment.

When the increased step size of the first adjustment is greater than the third preset value, it means that when the voltage is adjusted with this step size, although the first result less than the first preset value is found more quickly; however, some states may be missed due to the large adjustment amplitude, and the accuracy of using the first result as a basis for determining the valley voltage is reduced. Here, operation S316 is performed to reduce the read amount of the specified data stored at the target location, and then operation S303 is re-performed.

At operation S322, if there is a first result less than or equal to the first preset value among the plurality of first results, operation S318 is performed.

It should be noted that the process of determining the valley voltage in other levels of read voltage corresponding to the lower page and the process of determining the valley voltage in the multi-level read voltages corresponding to the middle page and upper page are similar to the method disclosed in the example described above, and will not be repeated here.

The method for operating the memory device provided by the example of the present application includes, taking the number of bits at the target location in the array of memory cells which are flipped in a result of reading at the target read voltage relative to specified data which is actually stored as a first value, performing multiple adjustments to the initial target read voltage, and respectively obtaining a first result corresponding to the target location at read voltages after each of the adjustments; determining a valley voltage in accordance with the a plurality of obtained first results as a read voltage for performing a read operation on the array of memory cells. This method may effectively avoid the problems of long time consumption and incomplete scene coverage caused by using the retry table, and to save the space occupied by the retry table, find the valley voltage more quickly and accurately, thereby effectively reducing the time delay in determining the valley voltage and improving product reliability and user experience.

It should be noted that the methods disclosed in the examples of the present application are able to solve many problems existing in the re-read operation, but are not used to limit the application scenarios in the examples of the present application, and the methods disclosed in the examples of the present application are also applicable to conventional read operations.

An example of the present application provides a memory device, as shown in FIG. 3b, the memory device 300 includes: an array of memory cells 301; peripheral circuit 302, coupled to the array of memory cells 301 and configured to perform the following operations shown in FIG. 7.

At operation S10, the method may include obtaining a first result corresponding to a target location in the array of memory cells in the memory device at an initial target read voltage; the first result includes information which represents the number of bits at the target location which are flipped in a result of reading at the target read voltage relative to specified data which is actually stored, the specified data is stored at the target location; perform multiple adjustments to the initial target read voltage.

At operation S20, the method may include performing multiple adjustments to the initial target read voltage, and respectively obtaining the first result corresponding to the target location at the read voltages after each of the adjustments.

At operation S30, the method may include determining a valley voltage in accordance with the obtained a plurality of first results; the valley voltage is a read voltage for performing a read operation on the array of memory cells.

Here, the structure of the memory device refers to FIG. 3b described above, and the structure of the peripheral circuit refers to FIG. 5 described above, which will not be repeated here.

In some examples, the peripheral circuit is configured to, before obtaining the first result corresponding to the target location at the initial target read voltage, set the read mode of the memory device to a single level read mode; the single level read mode may include reading at least one bit of the stored state stored in the memory cell through a first-level read voltage.

In some examples, the memory cells of the array of memory cells include M bits, the memory device includes M-type pages, and the M-bit memory cell reads its M-bit stored data through read voltages at N levels; the M and N are both integers greater than 1, and $N=2^M-1$.

The peripheral circuit may be configured to, for each level of the multi-level read voltages corresponding to each type of page, determine the valley voltage in each level in accordance with the plurality of first results corresponding to the multiple read voltages in each of the level.

In some examples, when the stored bits of the memory cell include three bits, the corresponding storage states include the 0-th state to the 7-th state, referring to FIG. 8, the 8 states are the 0-th state E, the first state P1, the second state P2 . . . the 7th state P7, and the binary data corresponding to the 8 states are 111, 110, 100, 000, 010, 011, 001, 101, respectively. Accordingly, the memory device includes three types of pages, e.g., lower page, middle page, and upper page. Here, the three stored bits corresponding to the 8 states are stored in the lower page, middle page, and upper page respectively. Taking the memory cell shown in FIG. 8 as an example, the three-bit memory cell reads its three-bit and eight-state stored data through a 7-level read voltage.

In some examples, each type of page corresponds to a multi-level read voltage, as shown in FIG. 8, and the lower page corresponds to a first-level read voltage L1 and a fifth-level read voltage L5. For the first-level read voltage L1 and the fifth-level read voltage L5 corresponding to the lower page, the valley voltage in the first-level read voltage L1 may be determined in accordance with a plurality of first results corresponding to the multiple read voltages in the first-level read voltage L1. Then, the valley voltage in the fifth-level read voltage L5 may be determined in accordance with the plurality of first results corresponding to the multiple read voltages in the fifth-level read voltage L5; thus, the valley voltage in each level of the multi-level read voltage corresponding to the lower page may be obtained.

The process of determining the valley voltage in each level of the multi-level read voltages corresponding to the middle page and the upper page is similar to that of the lower page, and will not be repeated here.

In some examples, the array of memory cells includes a plurality of memory blocks, each memory block includes a plurality of memory rows, each memory row includes a plurality of memory cells, a preset number of the memory cells forming a code word; the peripheral circuit is configured to, in the process of performing a write operation on the array of memory cells, write the specified data at a target location in the array of memory cells. The target location includes at least one of each of the memory blocks, each of the memory rows, and each of the code words.

In some examples, in the process of performing a write operation on the array of memory cells, the specified data is written in a code word of the array of memory cells.

In some examples, the peripheral circuit is configured to obtain a first preset value and a third preset value. The first preset value may be obtained in accordance with historical data. The first preset value is less than or equal to a fail bit count supported by the memory device upper limit.

In some examples, the peripheral circuit is configured to store specified data; read the specified data stored at the target location at the initial target read voltage to obtain a second result; perform a logical operation on the stored specified data and the second result to obtain a third result; when the first result includes information which represents a relationship of size between the number of bits at the target location which are flipped in a result of reading at the target read voltage relative to specified data which is actually stored and a first preset value, compare the number of bits in the third result that represent flip of bits in the second result relative to the specified data with a first preset value, and take the result of comparing to be the first result.

In some examples, the peripheral circuit includes: a first latch D1, a second latch D2, and a third latch D3. The first latch D1 is configured to store the specified data; the latch D2 is configured to store the second result; and the third latch D3 is configured to store the third result.

For example, the first latch D1, the second latch D2, and the third latch D3 are located in the page buffer of the peripheral circuit.

In some examples, the first latch D1 includes M sub-latches, and the M sub-latches are respectively used to store data of M types of pages.

In some examples, taking the memory cell shown in FIG. 8 as an example, the first latch includes three sub-latches (Latch1-1, Latch1-2, Latch1-3), and the specified data 110110110 . . . 110 is stored in the three sub-latches of the first latch. Among them, Latch1-1 is used to store the upper page data, Latch1-2 is used to store the middle page data, and Latch1-3 is used to store the lower page data, that is, Latch1-1 is used to store 111 . . . 1, Latch1-2 is used to store 111 . . . 1, and Latch1-3 is used to store 000 . . . 0.

As shown in FIG. 10, the specified data stored in the code word is read at the initial target read voltage V1, and the second result is obtained. In some examples, the data stored in the lower page of the memory cell in the code word is read at the initial target read voltage V1, the memory cell whose threshold voltage is less than the initial target read voltage V1 is labeled as bit 1, and the memory cell whose threshold voltage is greater than the initial target read voltage V1 is labeled as bit 0; a second result is obtained and stored in the second latch of the memory device.

In some examples, an XOR operation is performed on the data stored in the sub-latches Latch1-3 of the first latch and the second result to obtain a third result; the third result is stored in a third latch of the memory device.

In some examples, each code word includes 23 TLC memory cells, and the specified data written into the code word is 11011011011011011011011; that is, the specified data stored in the first latch is 110110110110110110110110, and the data stored in the sub-latch Latch1-1 of the first latch is 11111111; the data stored in the sub-latch Latch1-2 of the first latch is 11111111, and the data stored in the sub-latch Latch1-3 of the first latch is 00000000, the lower page data of the specified data stored in the memory cell of the code word read at the initial target read voltage V1 is 01010101, then the third result is 01010101, the part in which the bit is 1 in the third result represents the number of bits which are flipped in the read data at the target location relative to the data written into the same target location.

In some examples, the first result includes information which represents a relationship of size between the number of bits at the target location which are flipped in a result of reading at the target read voltage relative to specified data which is actually stored and a first preset value. The peripheral circuit is configured to determine whether the number of bits at the target location which are flipped in a result of reading at the target read voltage relative to specified data which is actually stored is greater than a first preset value, and take the result of comparing to be the first result.

Further, the peripheral circuit is configured to, when the number of bits in the third result that represent flip of bits in the second result relative to the specified data is greater than the first preset value, determine that the first result is a failed state; when the number of bits in the third result that represent flip of bits in the second result relative to the specified data is less than or equal to the first preset value, determine that the first result is a pass state.

In some examples, the peripheral circuit is configured to, during multiple adjustment to the initial target read voltage, each time perform a first adjustment to the read voltage after the previous adjustment. The step size of the first adjustment may be a fixed value.

In some examples, referring to Table 1 and FIG. 10, the first result corresponding to the initial target read voltage V1 obtained through the first iteration is a failed state. Multiple adjustments are performed to the initial target read voltage V1; in some examples, the first adjustment is performed to the initial target read voltage V1 to obtain the target adjustment voltage (V2 shown in FIG. 10), which is labeled as the target read voltage V2 after the first adjustment, the first result corresponding to the initial target read voltage V1 obtained through the second iteration is a failed state. There is a first voltage difference ΔV1 between the initial target read voltage V1 and the target read voltage V2 after the first adjustment, and the magnitude of the first voltage difference is the step size of the first adjustment. The step size of the first adjustment is relatively large, and the first adjustment may be understood as a large amplitude adjustment.

In some examples, the peripheral circuit is configured to, after the first pass state after one or more failed states occur among the plurality of first results corresponding to the target read voltages after multiple adjustments, perform a second adjustment to the read voltage after the previous adjustment. The step size of the second adjustment may be less than the step size of the first adjustment.

In some examples, a first adjustment is performed to the target read voltage V2 after the first adjustment to obtain the target read voltage V3 after the second adjustment; the first result corresponds to the target read voltage V3 after the second adjustment obtained through the third iteration is a pass state, e.g., a first pass state after failed states occurs among the plurality of first results corresponding to the target read voltages after multiple adjustments.

A second adjustment is performed to the target read voltage V2 after the second adjustment to obtain the target read voltage V4 after the third adjustment, the first result corresponding to the target read voltage V4 after the third adjustment obtained through the fourth iteration is a pass state. There is a second voltage difference ΔV2 between the target read voltage V3 after the second adjustment and the target read voltage V4 after the third adjustment, and the magnitude of the second voltage difference ΔV2 is the step size of the second adjustment. The step size of the second adjustment is less than the step size of the first adjustment, e.g., the second voltage difference ΔV2 is less than the first voltage difference ΔV1. The step size of the second adjustment is relatively small, and the second adjustment may be understood as a small amplitude adjustment. A second adjustment is continued to perform on the target read voltage V4 after the third adjustment to obtain the target read voltage V5 after the fourth adjustment, the first result corresponding to the target read voltage V5 after the fourth adjustment obtained through the fifth iteration is a pass state.

In another example, the peripheral circuit is configured to, after the first pass state after one or more failed states occur among the plurality of first results corresponding to the target read voltages after multiple adjustments, performing a third adjustment to the read voltage after the previous adjustment in accordance with the number of counting for the third result corresponding to the first pass state; the step size of the third adjustment may vary according to the number of bits in the third result which represents the number of bits in the second result which are flipped relative to the specified data.

In some examples, the first result corresponding to the target read voltage V4 after the third adjustment obtained through the fourth iteration is a first pass state after failed states among the plurality of first results corresponding to the target read voltages after multiple adjustments, and a third adjustment is performed to the target read voltage V4 after the third adjustment in accordance with the number of counting for the third result corresponding to the target read voltage V4 after the third adjustment. In some examples, the number of bits in the third result that represent flip of bits in the second result corresponding to the target read voltage V4 after the third adjustment relative to the specified data may be counted. If the result of counting is less than 0.5 times the first preset value, it may be considered that the number of flipped bits is small. This means that the error rate of the read result obtained through performing the read operation with the target read voltage V4 after the third adjustment is very low. In this case, the step size of the third adjustment may be adjusted to be greater than the step size of the first adjustment, possible states may be faster explored through increased step size, thereby efficiency is improved.

If the result of counting is greater than or equal to 0.5 times the first preset value, it may be considered that although the number of flipped bits is within the upper limit of the fail bit count supported by the memory device; however, the number of flipped bits is large, which means that the error rate of the read result obtained through performing the read operation with the target read voltage V4 after the third adjustment is high. In this case, the step size of the third adjustment may be adjusted to be less than the step size of the second adjustment. By reducing the step size, more first results may be obtained as pass states at the read voltages which are close to the target read voltage V4 after the third adjustment at which the first pass state is obtained, thereby increasing the basis for determining the valley voltage.

In some examples, the peripheral circuit is configured to, during multiple adjustments to the initial target read voltage, when the plurality of first results corresponding to the target read voltages after multiple adjustments indicate the change from a failed state to at least one pass state and to a failed state again, stop adjusting the read voltage.

If the plurality of first results corresponding to the target read voltages after multiple adjustments do not indicate the change from a failed state to at least one pass state and to a failed state again, a first adjustment is performed to the target read voltage V5 after the fourth adjustment to obtain the target read voltage V6 after the fifth adjustment. The first result may correspond to the target read voltage V6 after the fifth adjustment obtained through the sixth iteration is a failed state. Here, when the plurality of first results corresponding to the target read voltages after multiple adjustments indicate the change from a failed state to at least one pass state and to a failed state again, adjustment of the read voltage is stopped, the operation ends.

In some examples, the peripheral circuit is configured to: when the number of the pass states between the failed states at both ends indicated by the plurality of first results corresponding to the adjusted read voltage include one, take the adjusted read voltage corresponding to the one pass state to be the valley voltage; when the number of the pass states between the failed states at both ends indicated by the plurality of first results corresponding to the adjusted read voltage include one than one, take the adjusted read voltage corresponding to the one pass state at the middle position among the plurality of pass states to be the valley voltage.

In some examples, the Table 1 shows that the number of the pass states between the failed states at both ends indicated by the plurality of first results corresponding to the adjusted read voltage include three, the adjusted read voltage corresponding to the one pass state at the middle position among the three pass states is to be the valley voltage, e.g., the read voltage corresponding to the first result obtained in the fourth iteration is to be the valley voltage. It may be understood that the read voltage corresponding to the first result obtained in the fourth iteration is the valley voltage in the first-level read voltage L1 corresponding to the lower page shown in FIG. 8.

In some examples, the Table 2 shows that the number of the pass states between the failed states at both ends indicated by the plurality of first results corresponding to the adjusted read voltage include two, the average of the read voltages corresponding to the first results obtained in the fourth and fifth iteration is to be the valley voltage.

In some examples, the Table 3 shows that the number of the pass states between the failed states at both ends indicated by the plurality of first results corresponding to the adjusted read voltage include one, e.g., the read voltage corresponding to the first result obtained in the third iteration is to be the valley voltage.

In some examples, the peripheral circuit is configured to: when the plurality of first results corresponding to the target read voltages after multiple adjustments are all failed states, increase the step size corresponding to the first adjustment; and when the increased step size of the first adjustment exceeds a third preset value, reduce read amount of the specified data stored at the target location.

In some examples, the third preset value is used as a limit value or restriction condition for controlling the step size of the first adjustment to balance speed and accuracy. The magnitude of the third preset value is related to the type of memory device, storage density, etc. The third preset value may be an empirical value, or it may be a default value configured when the memory device leaves the factory. The default value is obtained through extensive simulation experiments before the memory device leaves the factory. In some examples, the range of the third preset value is set to 80 mV to 100 mV.

It may be understood that when the increased step size of the first adjustment is greater than the third preset value, a balance between speed and accuracy may be achieved through reducing read amount of the specified data stored at the target location. In some examples, the amount of data stored in the specified data stored in the first latch remains unchanged, and the read amount of the specified data stored at the target location is reduced. The specified data is functional data that verifies the magnitude of the difference between the read data and the actual stored data, and is representative; thus, even if the read amount of the specified data stored at the target location is reduced, the necessary information will not be lost, and the threshold voltage change of the memory cell where the user data stored together with the specified data can still be indicated by the threshold voltage change of the memory cell where part of the specified data is located.

When obtaining the first result corresponding to the target location at the corresponding voltage, the total amount of data contained in the second result may be reduced, and the total amount of data contained in the third result is also reduced after a logical operation on the corresponding part of the specified data stored in the first latch and the second result. The reduction of the total amount may reduce the number counted from the total amount to a certain extent, e.g., the number of bits in the third result that represent flip of bits in the second result relative to the specified data is also reduced. Thus, the number of bits in the third result that represent flip of bits in the second result relative to the specified data is more likely to be within the range of the first preset value. Accordingly, it is easier to find a first pass state after one or more failed states among the plurality of first results corresponding to the target read voltages after multiple adjustments.

In some examples, the first result includes information which represents the number of bits at the target location which are flipped in a result of reading at the target read voltage relative to specified data which is actually stored, the specified data is stored at the target location; the peripheral circuit is configured to: when the first result corresponding to the initial target read voltage is less than or equal to the first preset value, perform a first adjustment to the initial target read voltage in accordance with the first result to obtain a target adjusted read value; obtain a first result corresponding to the target adjusted read voltage at the target location.

In some examples, the peripheral circuit is configured to: when the first result corresponding to the target location at the target adjusted read voltage is less than the first preset value and greater than the second preset value, continue to perform the first adjustment to the target adjusted read voltage, and obtaining a first result corresponding to the target location at the adjusted read voltage, until the first result corresponding to the final adjusted read voltage is less than or equal to the second preset value; the step size of the first adjustment may change in accordance with the value of the first result.

In some examples, the peripheral circuit is configured to, when the first result corresponding to the final adjusted read voltage is less than or equal to the second preset value, the read voltage corresponding to the smallest first result among the plurality of first results is to be the valley voltage.

In some examples, the first preset value is set to 120, and the second preset value is set to 10. The read voltage corresponding to the smallest first result among the plurality of first results in Table 4 is to be the valley voltage, e.g., the read voltage corresponding to the first result obtained in the fourth iteration is to be the valley voltage.

In some examples, the peripheral circuit is configured to: when the plurality of first results corresponding to the target read voltages after multiple adjustments are all greater than the first preset value, increase the step size corresponding to the first adjustment; and when the increased step size of the first adjustment exceeds a third preset value, reducing read amount of the specified data stored at the target location.

Figure 13:
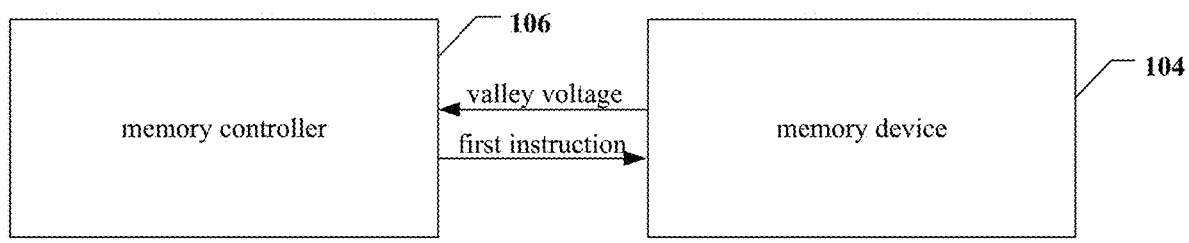
FIG. 13 is a block diagram of a memory system provided by an example of the present application.
Figure 14:
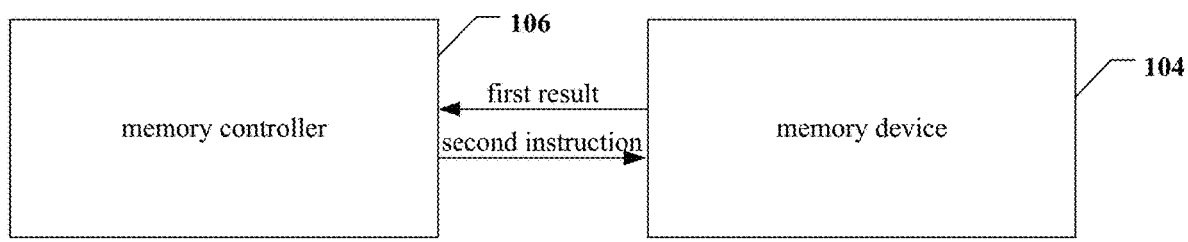
FIG. 14 is a block diagram of a memory system provided by another example of the present application.

An example of the present application provides a memory system, as shown in FIG. 13, the memory system 102 includes: one or more memory devices 104 as described in the above examples; and a memory controller 106 coupled to and controlling the memory device 104.

In some examples, the memory controller 106 is configured to: send a first instruction before performing a read operation on data stored in the memory device, the first instruction indicating obtaining the valley voltage; the memory device 104 is configured to: receive the first instruction, obtain a valley voltage, and send the obtained valley voltage to the memory controller 106. The memory controller 106 is further configured to: perform a read operation on data stored in the memory device 104 in accordance with the valley voltage; perform an error correction code decoding operation on the read result of the read operation.

In some examples, the error correction code decoding operation includes a hard decoding operation employing a Low Density Parity Check Code (LDPC).

Thus, the memory controller directly receives the valley voltage obtained from the memory device side, which reduces the data transmission time between the memory controller and the memory device, and reserves sufficient time for subsequent error correction code (ECC) decoding operations on the read results of the read operation. Furthermore, the memory controller directly performs a read operation and an error correction code decoding operation in accordance with the valley voltage, which shortens the overall operation time.

An example of the present application provides a method for operating a memory system, the operating method may include: before performing a read operation on the data stored in the memory device of the memory system, sending a first instruction, and the first instruction indicating to obtain a valley voltage; the valley voltage is obtained according to the operating method of any one of the examples described above; performing a read operation on data stored in the memory device in accordance with the valley voltage; performing an error correction code decoding operation on the read result of the read operation.

Another example of the present application provides a memory system, as shown in FIG. 13, the memory system 102 includes: at least one memory device 104; a memory controller 106 coupled to the at least one memory device 104. The memory controller 106 may be configured to: obtain a first result corresponding to a target location in the array of memory cells in the memory device at an initial target read voltage; the first result includes information which represents the number of bits at the target location which are flipped in a result of reading at the target read voltage relative to specified data which is actually stored, the specified data is stored at the target location, the specified data being stored at the target location; perform multiple adjustments to the initial target read voltage, and respectively obtain a first result corresponding to the target location at the target read voltage after each of the adjustments; determine the valley voltage in accordance with the obtained a plurality of first results; the valley voltage is a read voltage for performing a read operation on the array of memory cells.

In some examples, the memory controller 106 is configured to: send a second instruction before performing a read operation on the data stored in the memory device 104, the second instruction indicating to obtain first results at the target location at multiple different target read voltages; the memory device 104 is configured to: receive the second instruction, obtain a plurality of first results at the target location at the multiple different target read voltages, and send the obtained first results to the memory controller 106; the memory controller 106 is further configured to: determine a valley voltage in accordance with the plurality of first results respectively corresponding to multiple different read voltages; and perform a read operation on data stored in the memory device in accordance with the valley voltage.

In some examples, the array of memory cells in the memory device includes a plurality of memory blocks, each memory block includes a plurality of memory rows, each memory row includes a plurality of memory cells, a preset number of the memory cells forming a code word.

In some examples, the target location includes at least one of each of the memory blocks, each of the memory rows, and each of the code words.

In some examples, the memory device 104 is configured to: read the specified data stored at the target location at the initial target read voltage to obtain a second result; perform a logical operation on the stored specified data and the second result to obtain a third result; when the first result includes the number of bits which represents the number of bits at the target location which are flipped in a result of reading at the target read voltage relative to specified data which is actually stored, count the number of bits in the third result that represent flip of bits in the second result relative to the specified data, and take the result of counting to be the first result; when the first result includes information which represents a relationship of size between the number of bits at the target location which are flipped in a result of reading at the target read voltage relative to specified data which is actually stored and a first preset value, compare the number of bits in the third result that represent flip of bits in the second result relative to the specified data with a first preset value, and take the result of comparing to be the first result.

In some examples, the data amount of the first result is less than a preset threshold of data amount.

Figure 15:
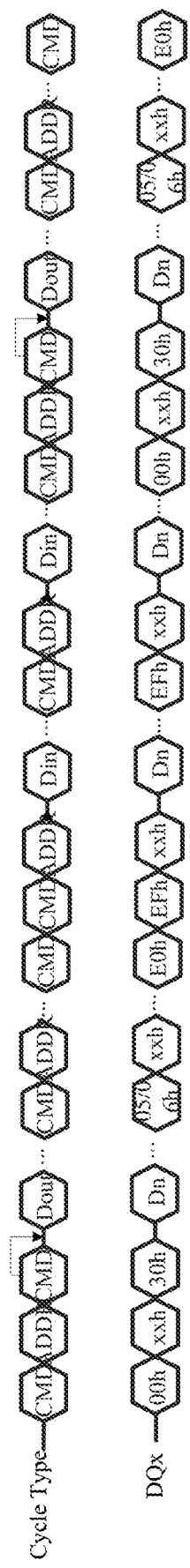
FIG. 15 is a timing diagram for performing a retry operation provided by another example of the present application.

FIG. 15 is a timing diagram for performing a read-retry operation provided by an example of the present application. DQx may be represented as a data bus signal, and Cycle Type may further represent the type of data bus signal.

As shown in FIG. 15, the read command may include, e.g., two subcommands (e.g., 00h and 30h), and in some examples, the memory device transmits the address ADDR of the data to be read (e.g., two column addresses C1 to C2 and three row addresses R1 to R3) between received subcommands 00h and 30h. After the non-memory device receives the subcommand 30h, during the reading time, the corresponding data DATA (e.g., Dn) in the page of the receiving address may be buffered in the page buffer, and then the data DATA will be read on demand. It should be noted that in the example described above, data corresponding to a page needs to be frequently transmitted between the memory device and the memory controller when performing a read-retry operation, and it takes a long time to transmit the data.

Figure 16:
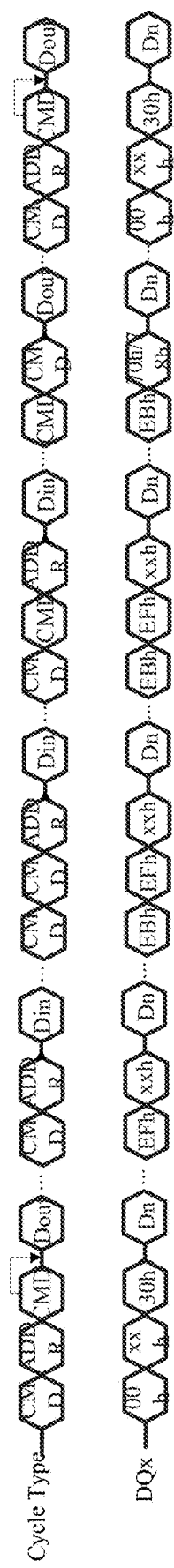
FIG. 16 is a timing diagram for determining the valley voltage and performing a read operation provided by an example of the present application.

FIG. 16 is a timing diagram for determining the valley voltage and performing a read operation in an example of the present application. As shown in FIG. 16, in addition to the conventional read command (e.g., the read command includes two subcommands (e.g., 00h and 30h)), the example of the present application also includes a second instruction, e.g., the second instruction includes the subcommands EBh and 70h/78h. In an exemplary example, the memory device 104 transmits the address ADDR of the data to be read (e.g., two column addresses C1 to C2 and three row addresses R1 to R3) between received subcommands 00h and 30h. The memory device 104, after receiving the sub-command 30h, receives the sub-commands EBh and 70h/78h of the second instruction, the memory device 104 obtains a first result corresponding to a target location in an array of memory cells of a memory device at a target read voltage, and sends the obtained first result to the memory controller. The memory controller determines a valley voltage in accordance with the plurality of first results respectively corresponding to multiple different read voltages received from the memory device; and perform a read operation on data stored in the memory device in accordance with the valley voltage.

It should be noted that the second instruction provided in the example of the present application is only an example and should not unduly limit the scope of the present disclosure.

In some examples, the data amount of the first result is less than the preset threshold of data amount, e.g., the data amount of the first result ranges from 1 byte to 4 byte, therefore, in the process of determining the valley voltage, the data transferred between the memory device and the memory controller has small amount and fast speed, which is beneficial to improving the overall speed of the read operation.

An example of the present application provides a method for operating a memory system, including: obtaining a first result corresponding to a target location in the array of memory cells in the memory device at an initial target read voltage; the first result includes information which represents the number of bits at the target location which are flipped in a result of reading at the target read voltage relative to specified data which is actually stored, the specified data is stored at the target location; performing multiple adjustments to the initial target read voltage, and respectively obtaining a first result corresponding to the target location at the target read voltage after each of the adjustments; determining a valley voltage in accordance with the obtained a plurality of first results; the valley voltage is a read voltage for performing a read operation on the array of memory cells.

In some examples, the method further includes: sending a second instruction before performing a read operation on the data stored in the memory device, the second instruction indicating to obtain a plurality of first results at a target location at multiple different target read voltages; determining a valley voltage in accordance with the plurality of first results respectively corresponding to multiple different read voltages; and perform a read operation on data stored in the memory device in accordance with the valley voltage.

In some examples, the data amount of the first result is less than the preset threshold of data amount, e.g., the data amount of the first result ranges from 1 byte to 4 byte, therefore, in the process of determining the valley voltage, the data transferred between the memory device and the memory controller has small amount and fast speed, which is beneficial to improving the overall speed of the read operation.

In some examples, the method also includes: reading the specified data stored at the target location at the initial target read voltage to obtain a second result; performing a logical operation on the stored specified data and the second result to obtain a third result; when the first result includes the number of bits which represents the number of bits at the target location which are flipped in a result of reading at the target read voltage relative to specified data which is actually stored, counting the number of bits in the third result that represent flip of bits in the second result relative to the specified data, and taking the result of counting to be the first result; when the first result includes information which represents a relationship of size between the number of bits at the target location which are flipped in a result of reading at the target read voltage relative to specified data which is actually stored and a first preset value, comparing the number of bits in the third result that represent flip of bits in the second result relative to the specified data with a first preset value, and taking the result of comparing to be the first result.

Another example of the present application provides a memory device, as shown in FIG. 5, the memory device includes: an array of memory cells 301 including a plurality of memory cells; peripheral circuit coupled to the array of memory cells 301, including control logic 512 and a page buffer 504; the control logic 512 is configured to: store specified data in a first latch of the page buffer; store the specified data stored in the first latch at the target read voltage to obtain a second result, and store the second result in a second latch of the page buffer; perform a logical operation on the stored specified data and the second result to obtain a third result, and store the third result in the third latch of the page buffer; when the first result includes the number of bits which represents the number of bits at the target location which are flipped in a result of reading at the target read voltage relative to specified data which is actually stored, count the number of bits in the third result that represent flip of bits in the second result relative to the specified data, and take the result of counting to be the first result; when the first result includes information which represents a relationship of size between the number of bits at the target location which are flipped in a result of reading at the target read voltage relative to specified data which is actually stored and a first preset value, compare the number of bits in the third result that represent flip of bits in the second result relative to the specified data with a first preset value, and take the result of comparing to be the first result.

The first result includes information which represents the number of bits at the target location which are flipped in a result of reading at the target read voltage relative to specified data which is actually stored, the specified data is stored at the target location.

In some examples, the array of memory cells in the memory device includes a plurality of memory blocks, each memory block includes a plurality of memory rows, each memory row includes a plurality of memory cells, a preset number of the memory cells forming a code word.

In some examples, the target location includes at least one of each of the memory blocks, each of the memory rows, and each of the code words.

Another example of the present application provides a method for operating a memory device, the memory device including an array of memory cells and a page buffer; the method including: storing specified data in a first latch of the page buffer; reading the specified data stored at the target location at a target read voltage to obtain a second result, and storing the second result in a second latch of the page buffer; performing a logical operation on the stored specified data and the second result to obtain a third result, and storing the third result in the third latch of the page buffer; when the first result includes the number of bits which represents the number of bits at the target location which are flipped in a result of reading at the target read voltage relative to specified data which is actually stored, counting the number of bits in the third result that represent flip of bits in the second result relative to the specified data, and taking the result of counting to be the first result; when the first result includes information which represents a relationship of size between the number of bits at the target location which are flipped in a result of reading at the target read voltage relative to specified data which is actually stored and a first preset value, comparing the number of bits in the third result that represent flip of bits in the second result relative to the specified data with a first preset value, and taking the result of comparing to be the first result; the first result includes information which represents the number of bits at the target location which are flipped in a result of reading at the target read voltage relative to specified data which is actually stored, the specified data is stored at the target location.

Figure 17:
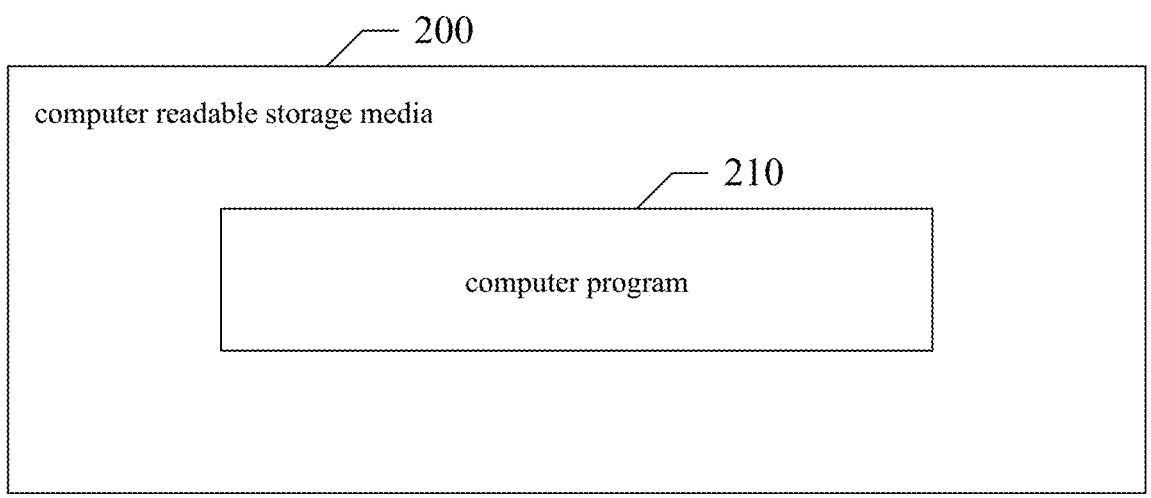
FIG. 17 is a block diagram of a computer readable storage medium provided by an example of the present application.

Referring to FIG. 17, FIG. 17 is a block diagram of a computer readable storage medium provided by an example of the present application. As shown in FIG. 17, an example of the present disclosure provides a computer readable storage medium, the computer readable storage medium 200 stores computer program 210 that when executed by a processor, may implement the method for operating a memory system of the technical schemes described above. The operating method includes: obtaining a first result corresponding to a target location in the array of memory cells in the memory device at an initial target read voltage; the first result includes information which represents the number of bits at the target location which are flipped in a result of reading at the target read voltage relative to specified data which is actually stored, the specified data is stored at the target location; performing multiple adjustments to the initial target read voltage, and respectively obtaining a first result corresponding to the target location at the target read voltage after each of the adjustments; determining the valley voltage in accordance with the obtained a plurality of first results; the valley voltage is a read voltage for performing a read operation on the array of memory cells.

It should be understood that reference throughout the description to "one example" or "an example" means that a particular feature, structure or characteristic related to the example is included in at least one example of the present application. Thus, appearances of "in one example" or "in an example" in various places throughout the description are not necessarily referring to a same example. Furthermore, these particular features, structures or characteristics may be combined in any appropriate manner in one or more examples. It should be understood that in various examples of the present application, sequence numbers of the processes described above do not mean the execution order, and the execution order of each process should be determined by its function and internal logic, and should not constitute any limitation to implementation process of examples of the present application. The serial numbers of examples of the present application described above are for the purpose of description only, and do not represent the advantages and disadvantages of the examples.

The above is only a preferred example of the present application, and does not limit the patent scope of the present application, and under the inventive concept of the present application, any equivalent structural transformation made by using content of the present application and the accompanying drawings, or direct/indirect application in other related technical fields are included in the patent protection scope of the present application.

INDUSTRIAL APPLICABILITY

The memory device and its operating method, the memory system and its operating method provided by the examples of the present application are able to effectively avoid the problems of long time consumption and incomplete scene coverage caused by using the retry table, and to save the space occupied by the retry table, find the valley voltage more quickly and accurately, thereby effectively reducing the time delay in determining the valley voltage. Meanwhile performing read operations at the obtained valley voltage greatly increases the probability of correctly reading the stored data, thus improving product reliability and user experience.

What is claimed is:

1. A memory device, comprising:
an array of memory cells; and
a peripheral circuit coupled to the array of memory cells and configured to:
obtain a first result corresponding to a target location in the array of memory cells at an initial target read voltage; wherein the first result includes information which represents a number of bits at the target location which are flipped in a result of reading at a target read voltage relative to specified data which is actually stored; and wherein the specified data is stored at the target location;
perform multiple adjustments to the initial target read voltage, and obtain a first result corresponding to the target location at the target read voltage after each of the multiple adjustments respectively;
if a change from a failed state to at least one pass state and then to the failed state again is indicated by a plurality of the first results corresponding to target read voltages after multiple adjustments, stop adjusting the initial target read voltage; and
determine a valley voltage in accordance with a plurality of the obtained first results; wherein the valley voltage is a read voltage for performing a read operation on the array of memory cells.

2. The memory device of claim 1, wherein:
the array of memory cells includes a plurality of memory blocks, each of the memory blocks includes a plurality of memory rows, and each of the memory rows includes a plurality of memory cells;
a preset number of the memory cells form a code word;
the peripheral circuit is configured to:
in a process of performing a write operation on the array of memory cells, write the specified data at the target location in the array of memory cells; and the target location includes at least one of each of the memory blocks, each of the memory rows, and each of the code words.

3. The memory device of claim 1, wherein the peripheral circuit is configured to:
store the specified data;
read the specified data stored at the target location at the initial target read voltage to obtain a second result;
perform a logical operation on the stored specified data and the second result to obtain a third result;
when the first result includes the number of bits which represents the number of bits at the target location which are flipped in the result of reading at the target read voltage relative to specified data which is actually stored, count the number of bits in the third result that represent flip of bits in the second result relative to the specified data, and take the result of counting to be the first result; and
when the first result includes information which represents a relationship of size between the number of bits at the target location which are flipped in a result of reading at the target read voltage relative to specified data which is actually stored and a first preset value, compare the number of bits in the third result that represent flip of bits in the second result relative to the specified data with a first preset value, and take the result of comparing to be the first result.

4. The memory device of claim 3, wherein the peripheral circuit comprises:
a first latch configured to store the specified data;
a second latch configured to store the second result; and
a third latch configured to store the third result.

5. The memory device of claim 3, wherein:
the first result includes information which represents a relationship of size between the number of bits at the target location which are flipped in a result of reading at the target read voltage relative to specified data which is actually stored and a first preset value;
when the number of bits in the third result which represents the number of bits in the second result which are flipped relative to the specified data is greater than the first preset value, the first result is a failed state; and
when the number of bits in the third result which represents the number of bits in the second result which are flipped relative to the specified data is less than or equal to the first preset value, the first result is a pass state.

6. The memory device of claim 5, wherein the peripheral circuit is configured to:
when multiple adjustments are performed to the initial target read voltage, perform a first adjustment to the initial target read voltage after a previous adjustment for each of the multiple adjustments, a step size of the first adjustment being a fixed value.

7. The memory device of claim 6, wherein the peripheral circuit is configured to:
when a number of pass states between failed states at two ends indicated by the plurality of first results corresponding to adjusted target read voltages include one, take an adjusted target read voltage corresponding to at least one pass state to be the valley voltage, wherein the at least one pass state comprises a plurality of pass states; and
when the number of pass states between the failed states at two ends indicated by the plurality of first results corresponding to the adjusted target read voltages include more than one, take the adjusted target read voltage corresponding to one pass state at a middle position among the plurality of pass states to be the valley voltage.

8. The memory device of claim 6, wherein the peripheral circuit is configured to:
after a first pass state after failed states occurs among the plurality of first results corresponding to the target read voltages after multiple adjustments, perform a second adjustment to the read voltage after a previous adjustment, the step size of the second adjustment being less than that of the first adjustment.

9. The memory device of claim 6, wherein the peripheral circuit is configured to:
after a first pass state after failed states occurs among the plurality of first results corresponding to the target read voltages after multiple adjustments, perform a third adjustment to the read voltage after a previous adjustment in accordance with the result of counting in the third result corresponding to the first pass state, the step size of the third adjustment varying according to the number of bits in the third result which represents the number of bits in the second result which are flipped relative to the specified data.

10. The memory device of claim 3, wherein:
the first result includes the number of bits which represents the number of bits at the target location which are flipped in a result of reading at the target read voltage relative to specified data which is actually stored;
the peripheral circuit is configured to:
when the first result corresponding to the initial target read voltage is less than or equal to the first preset value, perform a first adjustment to the initial target read voltage in accordance with the first result to obtain a target adjusted read voltage; and
obtain a first result corresponding to the target location at the target adjusted read voltage.

11. The memory device of claim 10, wherein the peripheral circuit is configured to:
when the first result corresponding to the target location at the target adjusted read voltage is less than the first preset value and greater than a second preset value, continue to perform the first adjustment to the target adjusted read voltage, and obtain a first result corresponding to the target location at the adjusted read voltage, until the first result corresponding to a final adjusted read voltage is less than or equal to the second preset value, a step size of the first adjustment varying in accordance with a value of the first result; and
when the first result corresponding to the final adjusted read voltage is less than or equal to the second preset value, take the read voltage corresponding to a smallest first result among the plurality of first results to be the valley voltage.

12. The memory device of claim 6, wherein the peripheral circuit is configured to:
when a plurality of first results corresponding to the target read voltages after multiple adjustments are all failed states, or the plurality of first results are all greater than the first preset value, increase the step size corresponding to the first adjustment; and
when an increased step size of the first adjustment exceeds a third preset value, decrease an amount of reading on the specified data stored at the target location.

13. The memory device of claim 3, wherein the peripheral circuit is configured to:

obtain a first preset value, the first preset value being obtained in accordance with historical data, and less than or equal to an upper limit of a fail bit count supported by the memory device.

14. The memory device of claim 1, wherein the peripheral circuit is configured to:
before obtaining the first result corresponding to the target location at the initial target read voltage, set a read mode of the memory device to a single level read mode, the single level read mode including reading at least one bit of storage data stored in a memory cell of the array of memory cells with read voltages at one level, wherein the memory cell of the array of memory cells includes M bits, the memory device includes M-type pages, and the memory cell with M bits reads its M bits of storage data with read voltages at N levels; wherein M and N are both integers greater than 1, and $N=2^M-1$; and
wherein the peripheral circuit is configured to:
for read voltages at each level of the read voltages at multiple levels corresponding to each type of page, determine the valley voltage at each level in accordance with the plurality of first results corresponding to multiple read voltages at each level.

15. The memory device of claim 1, wherein the first result corresponding to the target location at the target read voltage is a pass state or a failed state.

16. A memory system, comprising:
one or more memory devices, comprising:
an array of memory cells;
a peripheral circuit coupled to the array of memory cells and configured to:
obtain a first result corresponding to a target location in the array of memory cells at an initial target read voltage; wherein the first result includes information which represents a number of bits at the target location which are flipped in a result of reading at a target read voltage relative to specified data which is actually stored; and wherein the specified data is stored at the target location;
perform multiple adjustments to the initial target read voltage, and obtain the first result corresponding to the target location at the target read voltage after each of the adjustments respectively;
if a change from a failed state to at least one pass state and then to the failed state again is indicated by a plurality of the first results corresponding to target read voltages after multiple adjustments, stop adjusting the initial target read voltage; and
determine a valley voltage in accordance with a plurality of the obtained first results; wherein the valley voltage is a read voltage for performing a read operation on the array of memory cells; and
a memory controller coupled to the memory device and controlling the one or more memory devices.

17. The memory system of claim 16, wherein:
the memory controller is configured to:
send a first instruction before performing a read operation on data stored in the one or more memory devices, wherein the first instruction indicates to obtain a valley voltage;
the one or more memory devices is configured to:
receive the first instruction, and obtain a valley voltage; and
send the obtained valley voltage to the memory controller; and the memory controller is further configured to:
perform a read operation on data stored in the one or more memory devices in accordance with the valley voltage; and
perform an error correction code decoding operation on a read result of the read operation.

18. A method for operating a memory device, comprising:
obtaining a first result corresponding to a target location in an array of memory cells in the memory device at an initial target read voltage; wherein the first result includes information which represents a number of bits at the target location which are flipped in a result of reading at a target read voltage relative to specified data which is actually stored, the specified data is stored at the target location;
performing multiple adjustments to the initial target read voltage, and obtaining the first result corresponding to the target location at the target read voltage after each of the adjustments respectively;
if a change from a failed state to at least one pass state and then to the failed state again is indicated by a plurality of the first results corresponding to target read voltages after multiple adjustments, stopping adjusting the initial target read voltage; and
determining a valley voltage in accordance with a plurality of the obtained first results; wherein the valley voltage is a read voltage for performing a read operation on the array of memory cells.

19. The method of claim 18, wherein:
the array of memory cells includes a plurality of memory blocks, each of the memory blocks includes a plurality of memory rows, and each of the memory rows includes a plurality of memory cells;
a preset number of the memory cells form a code word; and
the method further comprises:
in a process of performing a write operation on the array of memory cells, write the specified data at a target location in the array of memory cells; and
the target location includes at least one of each of the memory blocks, each of the memory rows, and each of the code words.

20. The method of claim 18, further comprises:
storing the specified data;
the obtaining a first result corresponding to a target location in the array of memory cells in the memory device at an initial target read voltage comprises:
reading the specified data stored at the target location at the target read voltage to obtain a second result;
performing a logical operation on the stored specified data and the second result to obtain a third result;
when the first result includes the number of bits which represents the number of bits at the target location which are flipped in a result of reading at the target read voltage relative to specified data which is actually stored, counting the number of bits in the third result that represent flip of bits in the second result relative to the specified data, and taking the result of counting to be the first result; and
when the first result includes information which represents a relationship of size between the number of bits at the target location which are flipped in a result of reading at the target read voltage relative to specified data which is actually stored and a first preset value, comparing the number of bits in the third result that represent flip of bits in the second result relative to the specified data with a first preset value, and taking the result of comparing to be the first result;

wherein the first result includes information which represents a relationship of size between the number of bits at the target location which are flipped in a result of reading at the target read voltage relative to specified data which is actually stored and a first preset value; and wherein the taking the result of comparing to be the first result comprises:

when the number of bits in the third result which represents the number of bits in the second result which are flipped relative to the specified data is greater than the first preset value, the first result is a failed state; and when the number of bits in the third result which represents the number of bits in the second result which are flipped relative to the specified data is less than or equal to the first preset value, the first result is a pass state.

* * * * *